(12) United States Patent
Khouri et al.

(10) Patent No.: US 7,678,317 B2
(45) Date of Patent: Mar. 16, 2010

(54) CONCRETE MIXING DRUM MANUFACTURING METHOD

(75) Inventors: Anthony J. Khouri, Bankstown (AU); William Rodgers, Chipping Norton (AU)

(73) Assignee: Anthony Khouri, Bankstown (AU)

( * ) Notice: Subject to any disclaimer, the term of this patent is extended or adjusted under 35 U.S.C. 154(b) by 1362 days.

(21) Appl. No.: 11/021,538

(22) Filed: Dec. 23, 2004

(65) Prior Publication Data

US 2005/0103431 A1 May 19, 2005

Related U.S. Application Data

(63) Continuation of application No. 10/049,605, filed on Jun. 6, 2002, now Pat. No. 6,902,311, which is a continuation of application No. PCT/AU00/01226, filed on Oct. 9, 2000.

(30) Foreign Application Priority Data

Oct. 8, 1999 (AU) .................................. PQ3338

(51) Int. Cl.
*B29C 41/08* (2006.01)
*B29C 70/16* (2006.01)

(52) U.S. Cl. .................. 264/255; 264/313; 264/318; 264/334; 264/275; 264/309; 264/219

(58) Field of Classification Search .................. None
See application file for complete search history.

(56) References Cited

U.S. PATENT DOCUMENTS

| | | | |
|---|---|---|---|
| 1,501,566 A | 7/1924 | Lundberg |
| 2,511,240 A | 6/1950 | Bohmer et al. |
| 2,696,372 A | 12/1954 | Gerst |
| 3,144,242 A | 8/1964 | Retzlaff |
| 3,165,789 A | 1/1965 | Jackson |
| 3,592,448 A | 7/1971 | Stevenson |
| 3,664,161 A | 5/1972 | Cressman |
| 3,700,512 A | 10/1972 | Pearson et al. |
| 3,717,328 A | 2/1973 | Stevenson |
| 3,795,121 A | 3/1974 | Cressman |
| 3,830,899 A | 8/1974 | Piccioli et al. |
| 3,929,321 A | 12/1975 | Sims |

(Continued)

FOREIGN PATENT DOCUMENTS

CN 1132486 A 10/1996

(Continued)

OTHER PUBLICATIONS

PCT International Search Report for International Application No. PCT/AU00/01226, Date of mailing of the International Search Report Dec. 6, 2000, 2 pages.

(Continued)

*Primary Examiner*—Edmund H. Lee
(74) *Attorney, Agent, or Firm*—Foley & Lardner LLP

(57) ABSTRACT

A method for making a concrete mixing drum includes forming a first layer of at least one polymeric material having a surface providing at least a portion of a barrel wall of the drum and a spiral mixing blade projecting from the wall on an inner surface of the drum and forming a second layer on the formed first layer.

70 Claims, 14 Drawing Sheets

BLADE REINFORCEMENT
OPERATION NO. 4
STATION NO. 3

U.S. PATENT DOCUMENTS

| | | | |
|---|---|---|---|
| 4,064,956 A | 12/1977 | Wildey |
| 4,086,378 A | 4/1978 | Kam et al. |
| 4,137,950 A | 2/1979 | Briscall |
| 4,223,997 A | 9/1980 | Violet et al. |
| 4,363,687 A | 12/1982 | Anderson |
| 4,391,108 A | 7/1983 | Albers |
| 4,435,082 A | 3/1984 | Bishop |
| 4,491,415 A | 1/1985 | Bishop |
| 4,521,116 A | 6/1985 | Adsit |
| 4,525,228 A | 6/1985 | Bowen |
| 4,569,648 A | 2/1986 | Riederer et al. |
| 4,585,356 A | 4/1986 | Hudelmaier |
| 4,634,284 A | 1/1987 | Bishop |
| 4,655,602 A | 4/1987 | Tomlinson |
| 4,730,934 A | 3/1988 | Schwing |
| 4,750,840 A | 6/1988 | Bishop |
| 4,756,623 A | 7/1988 | Bishop |
| 4,822,272 A | 4/1989 | Yanase et al. |
| 4,877,327 A | 10/1989 | Whiteman, Jr. |
| 4,937,010 A | 6/1990 | Maillat |
| 5,056,924 A | 10/1991 | Christenson |
| 5,118,198 A | 6/1992 | Whiteman, Jr. |
| 5,178,457 A | 1/1993 | Helmy |
| RE34,505 E | 1/1994 | Whiteman, Jr. |
| 5,302,017 A | 4/1994 | Platek et al. |
| 5,378,061 A | 1/1995 | Christenson |
| 5,399,192 A | 3/1995 | Yamasoe |
| 5,427,449 A | 6/1995 | Christenson et al. |
| 5,432,211 A | 7/1995 | Morita et al. |
| 5,441,341 A | 8/1995 | Halsted |
| 5,460,675 A | 10/1995 | Moser |
| 5,487,604 A | 1/1996 | Moran |
| 5,492,401 A | 2/1996 | Halsted |
| 5,683,177 A | 11/1997 | Hoferichter et al. |
| 5,772,938 A | 6/1998 | Sharp |
| 5,816,702 A | 10/1998 | Mays et al. |
| 5,839,924 A | 11/1998 | Ritson |
| H1872 H | 10/2000 | Bowman |
| 2002/0071336 A1 | 6/2002 | Smith et al. |

FOREIGN PATENT DOCUMENTS

| | | |
|---|---|---|
| DE | 956 378 | 1/1957 |
| DE | 956378 | 1/1957 |
| DE | 88 01 881 | 4/1988 |
| DE | 40 10 539 A1 | 10/1991 |
| EP | 0 438 852 B1 | 7/1991 |
| EP | 0 696 422 B1 | 2/1996 |
| EP | 0 998 383 B1 | 5/2000 |
| GB | 2 032 793 A | 5/1980 |
| GB | 2 274 404 A | 7/1994 |
| IL | 148560 | 9/2000 |
| JP | 53-88261 | 8/1978 |
| JP | 8-114096 A | 5/1996 |
| JP | 8-199052 A | 8/1996 |
| JP | 11-134001 A | 5/1999 |
| JP | 2001-79418 A | 3/2001 |
| SU | 421520 | 3/1974 |
| SU | 977188 | 11/1982 |
| SU | 1796533 A1 | 2/1993 |
| SU | 2 052 350 C1 | 1/1996 |
| WO | WO 97/32702 | 9/1997 |
| WO | WO 97/32702 A1 | 9/1997 |
| WO | WO 00/64651 | 11/2000 |
| WO | WO 01/26871 A1 | 4/2001 |
| WO | WO 03/101694 A1 | 12/2003 |
| WO | WO 2005/018894 A1 | 3/2005 |
| WO | WO 2005/018897 A1 | 3/2005 |
| WO | WO 2005/018898 A1 | 3/2005 |
| WO | WO 2005/018899 A1 | 3/2005 |
| WO | WO 2005/025438 A1 | 3/2005 |
| WO | WO 2005/025657 A1 | 3/2005 |
| WO | WO 2005/095073 A1 | 10/2005 |
| WO | WO 2005/113211 A1 | 12/2005 |

OTHER PUBLICATIONS

Supplementary European Search Report for International Application No. EP 03 81 8345, dated Dec. 4, 2008, 3 pages.
Supplementary European Search Report for International Application No. EP 03 81 8335, dated Dec. 4, 2008, 3 pages.
Supplementary European Search Report for International Application No. EP 04 77 7337, dated Dec. 4, 2008, 3 pages.
Supplementary European Search Report for International Application No. EP 03 81 8344, dated Dec. 4, 2008, 3 pages.
Supplementary European Search Report for PCT/AU0300664, date of mailing Jan. 8, 2008, 2 pages.
EPO Supplementary European Search Report relating to Application No. EP 00 96 9090, date of completion of the search Dec. 21, 2007 (3 pgs.).

POLYSTYRENE MOULD ASSEMBLY ONTO MANDREL
STATION NO. 2

POLYSTYRENE MOULDING STATION
STATION NO. 1

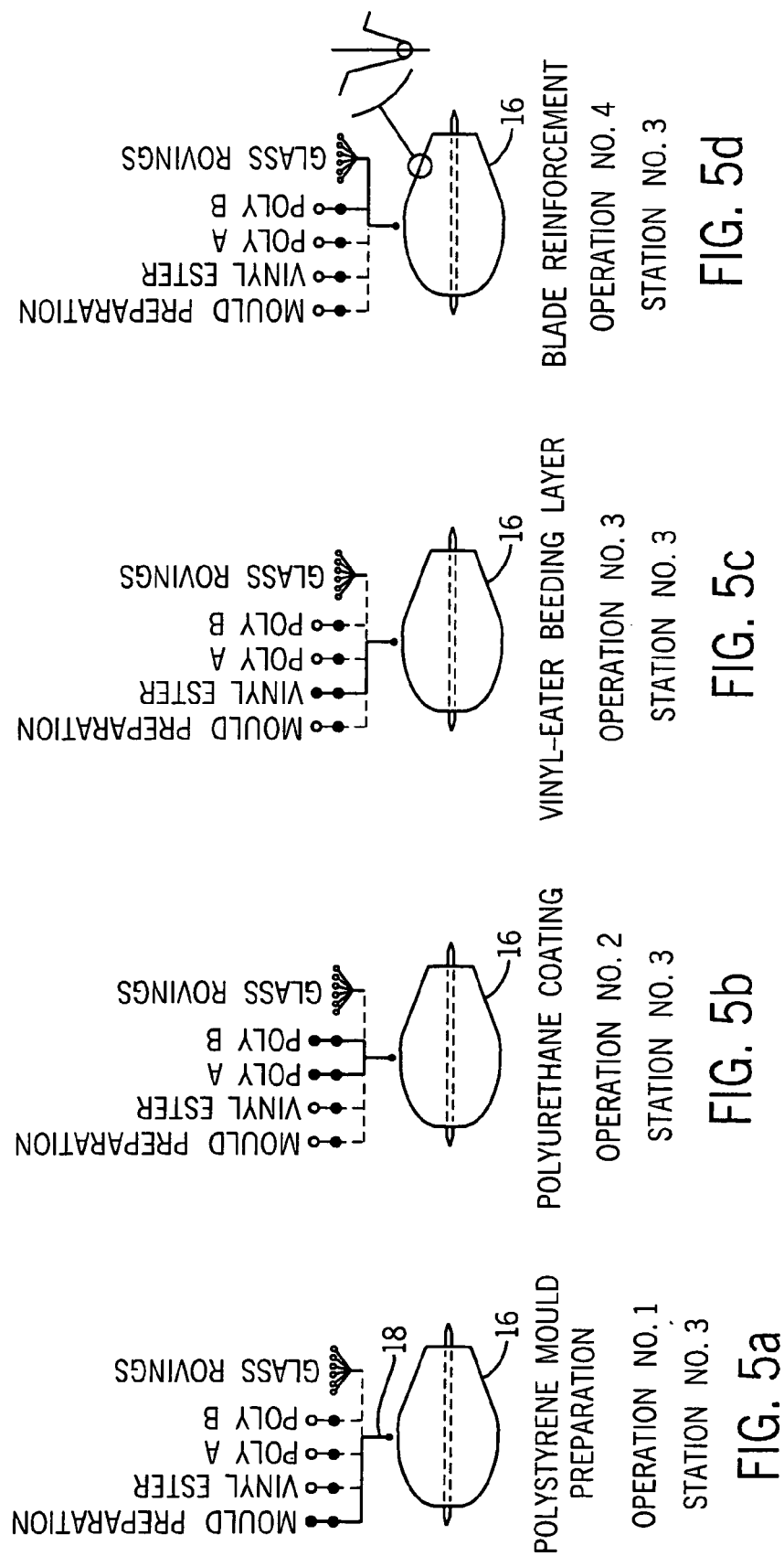

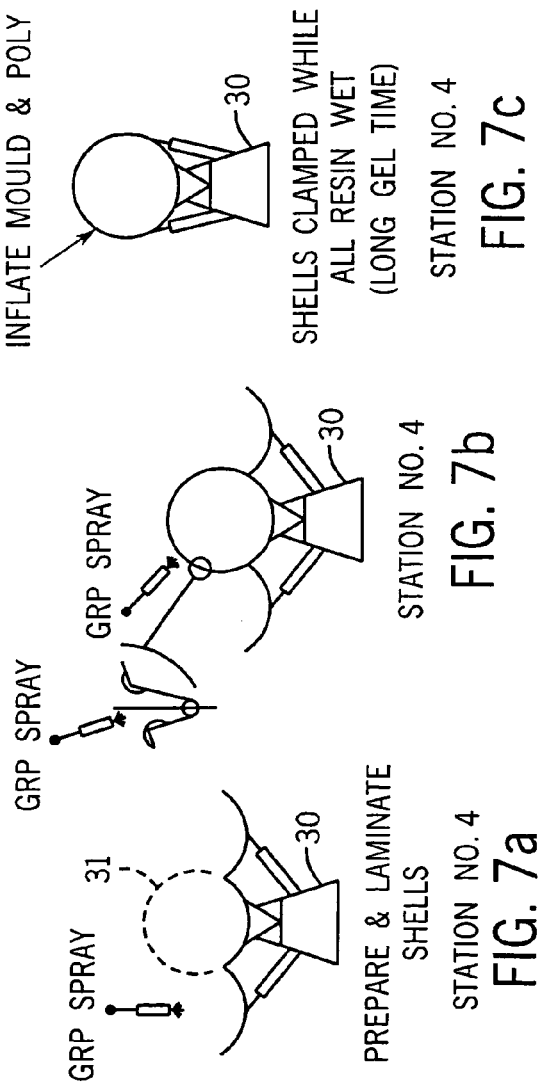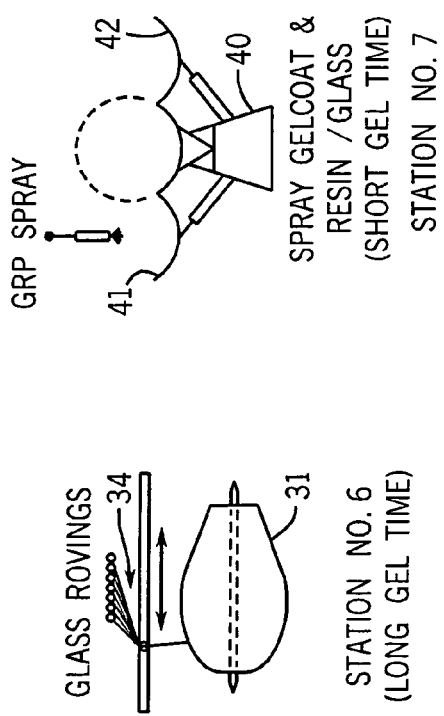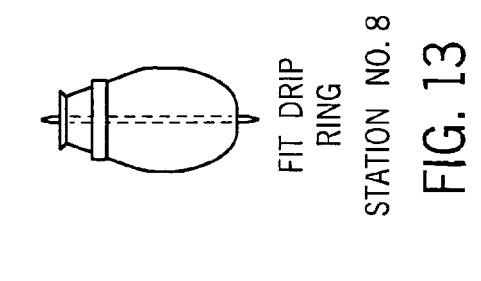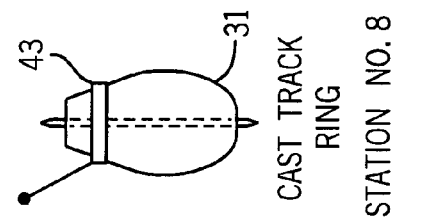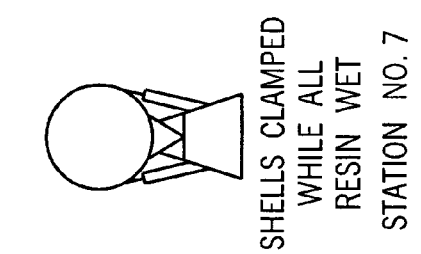

CONCRETE MIXING IN STEEL VESSEL

CONCRETE MIXING IN ELASTOMERIC VESSEL

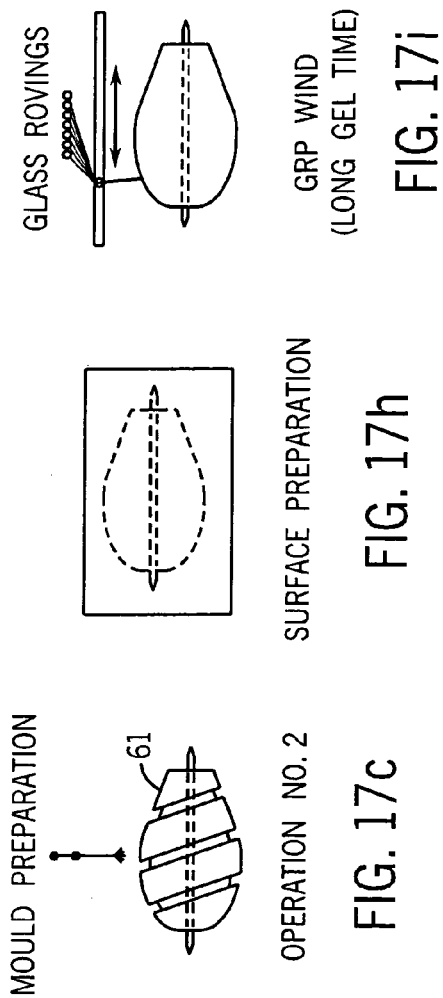
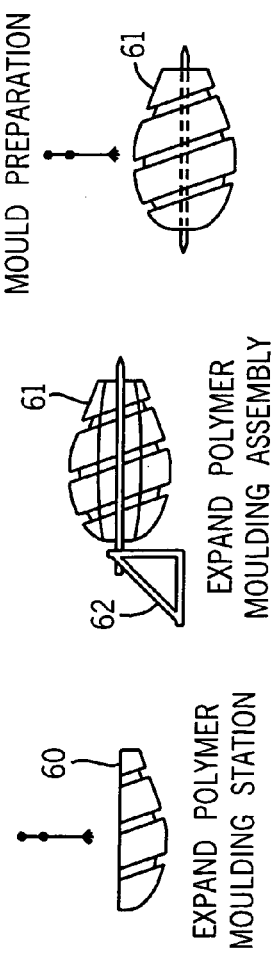
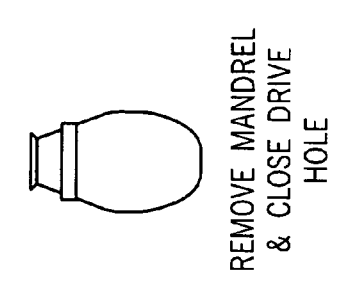
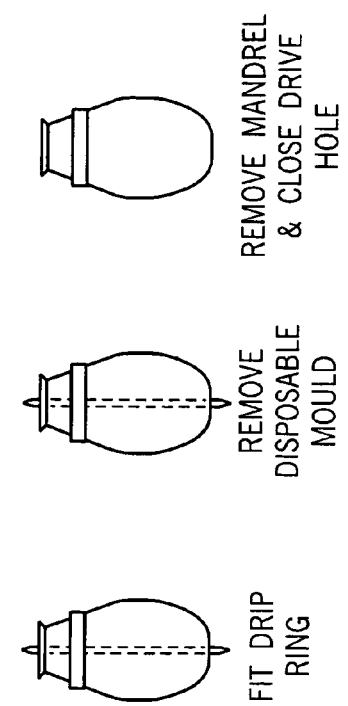
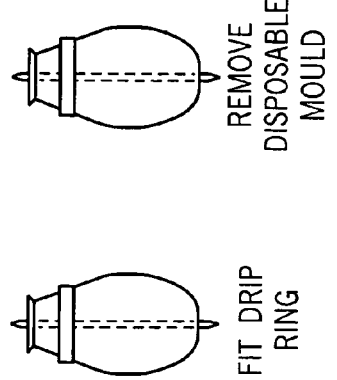
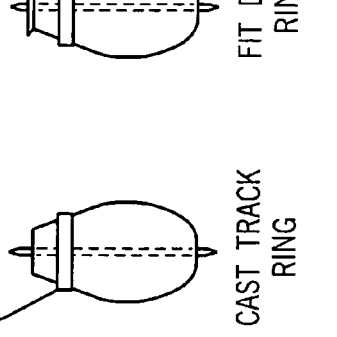
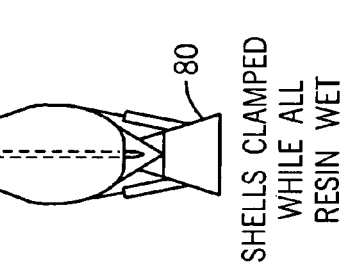
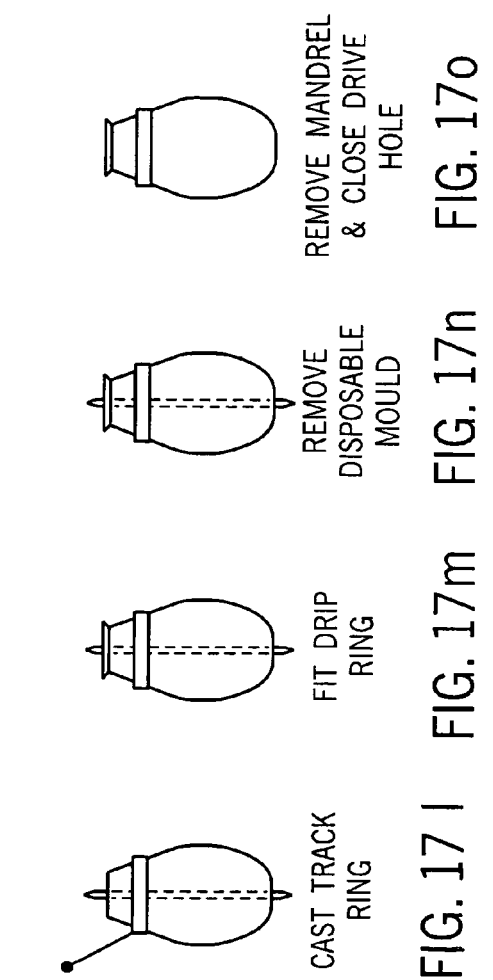
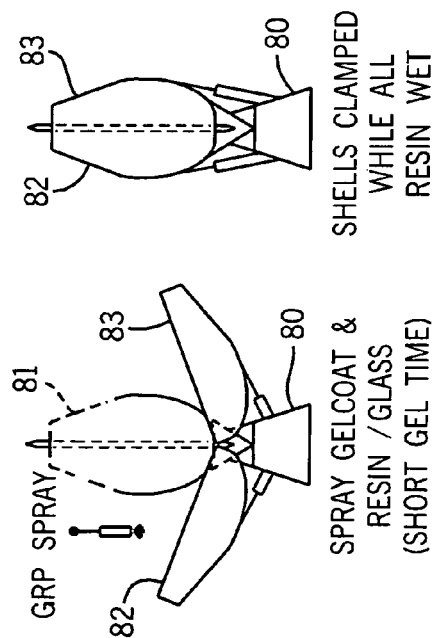

FIG. 17a — EXPAND POLYMER MOULDING STATION
FIG. 17b — EXPAND POLYMER MOULDING ASSEMBLY, OPERATION NO. 1
FIG. 17c — MOULD PREPARATION, OPERATION NO. 2
FIG. 17h — SURFACE PREPARATION
FIG. 17i — GRP WIND (LONG GEL TIME), GLASS ROVINGS
FIG. 17j — SPRAY GELCOAT & RESIN / GLASS (SHORT GEL TIME), GRP SPRAY
FIG. 17k — SHELLS CLAMPED WHILE ALL RESIN WET
FIG. 17l — CAST TRACK RING
FIG. 17m — FIT DRIP RING
FIG. 17n — REMOVE DISPOSABLE MOULD
FIG. 17o — REMOVE MANDREL & CLOSE DRIVE HOLE

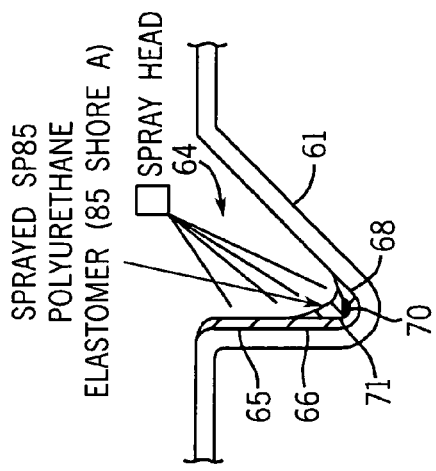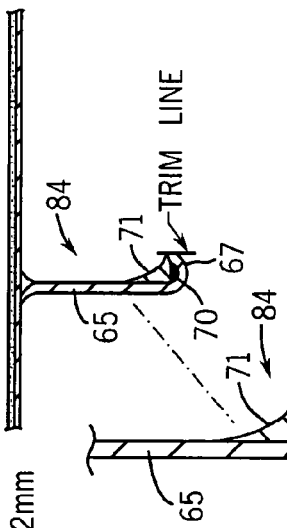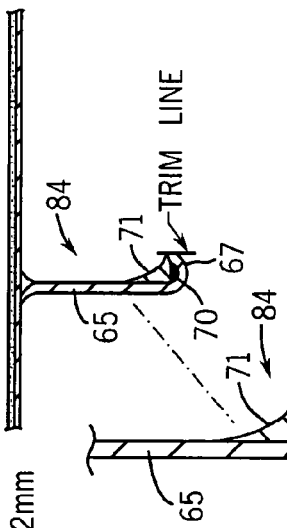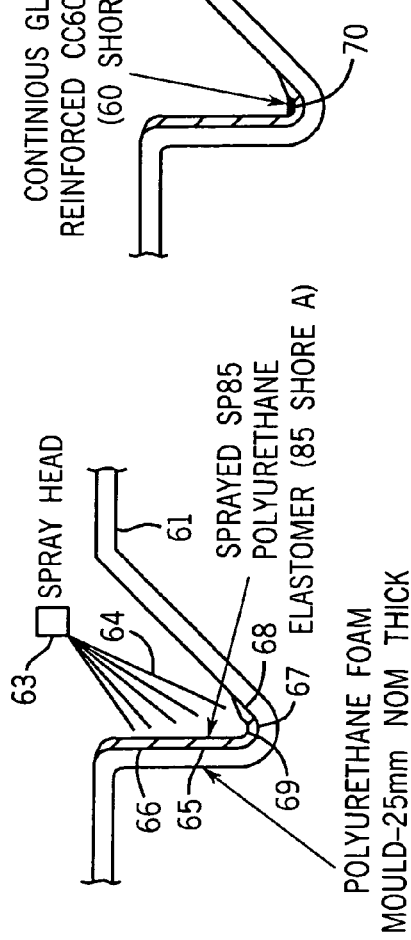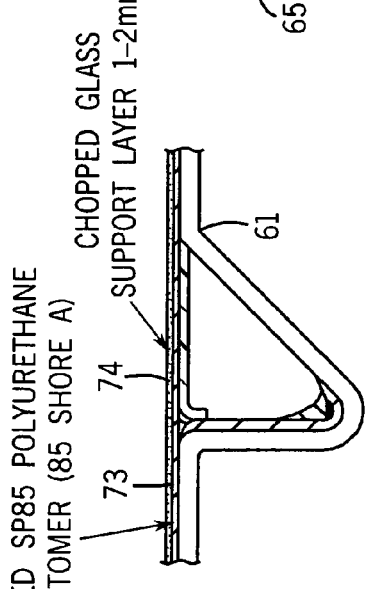

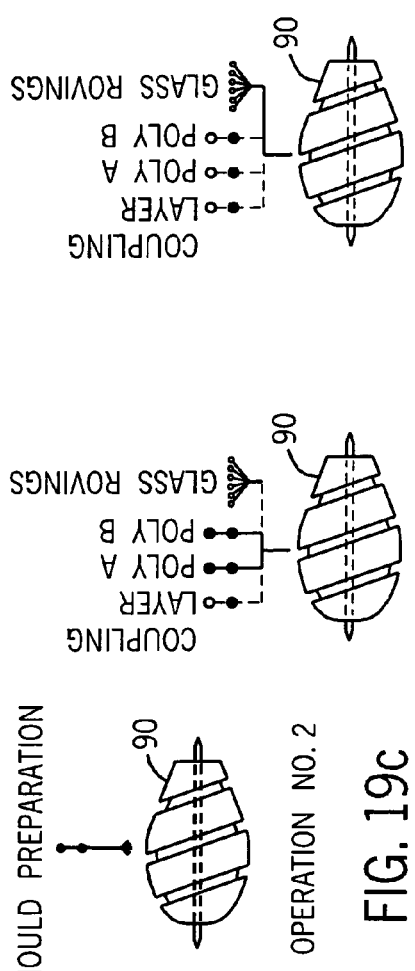
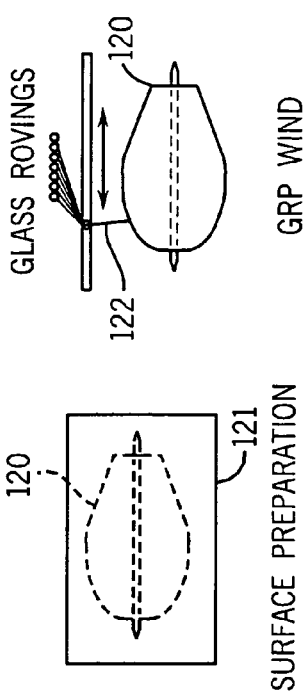

FIG. 19a EXPAND POLYMER MOULDING STATION

FIG. 19b EXPAND POLYMER MOULDING ASSEMBLY OPERATION NO. 1

FIG. 19c MOULD PREPARATION OPERATION NO. 2

FIG. 19d POLYURETHANE COATING OPERATION NO. 1

FIG. 19e BLADE REINFORCEMENT OPERATION NO. 2

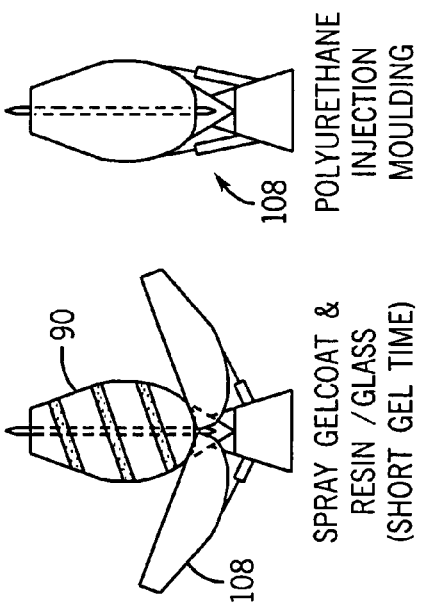
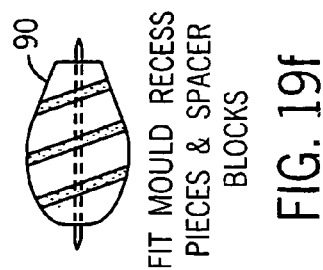

FIG. 19f FIT MOULD RECESS PIECES & SPACER BLOCKS

FIG. 19g SPRAY GELCOAT & RESIN / GLASS (SHORT GEL TIME)

FIG. 19h POLYURETHANE INJECTION MOULDING

FIG. 19i SURFACE PREPARATION

FIG. 19j GRP WIND (LONG GEL TIME)

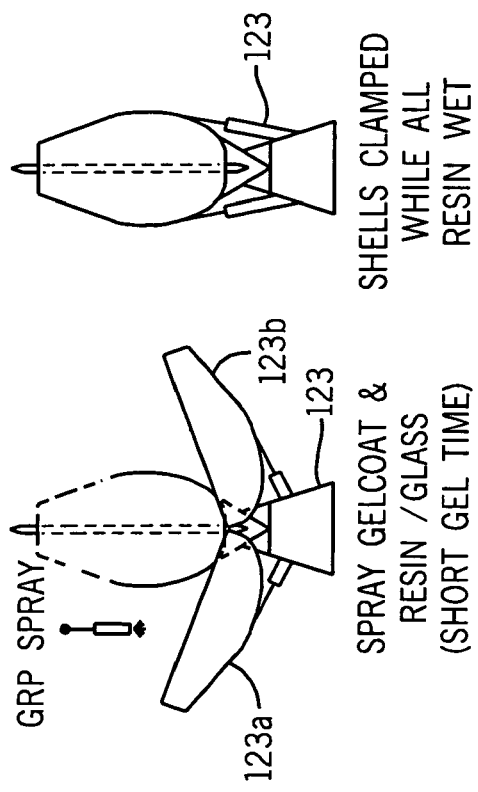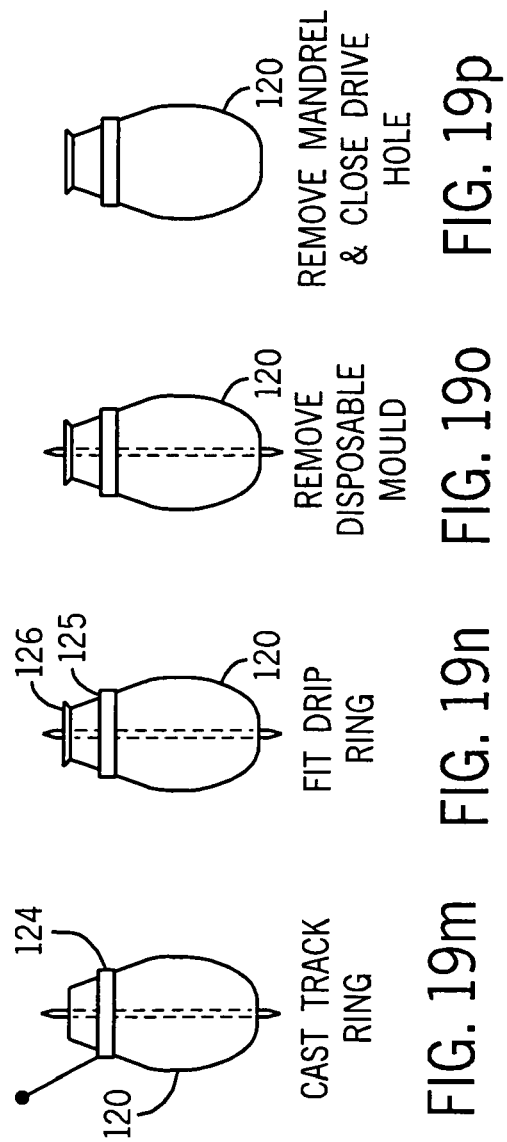

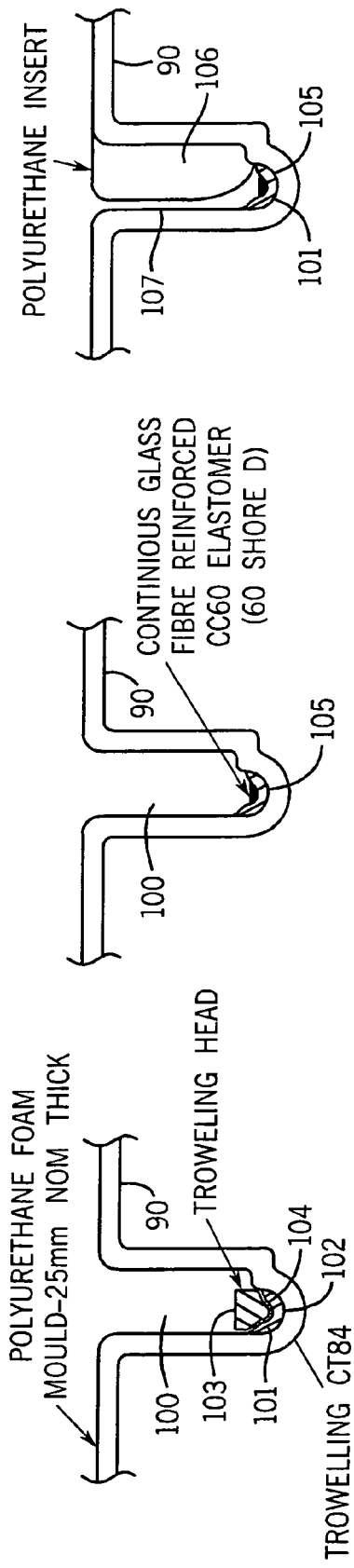
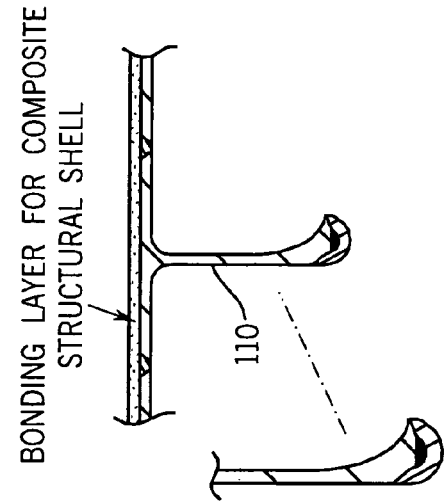
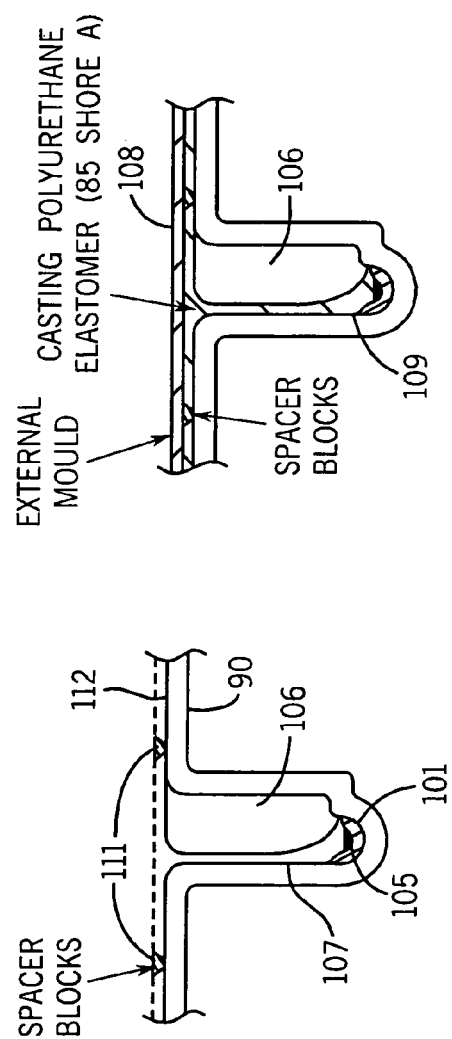

CONCRETE MIXING DRUM MANUFACTURING METHOD

CROSS-REFERENCE TO RELATED PATENT APPLICATIONS

The present continuation application claims priority under 35 U.S.C. § 120 from U.S. patent application Ser. No. 10/049,605 filed on Jun. 6, 2002 now U.S. Pat. No. 6,902,311 by Anthony J. Khouri and William Rodgers, and entitled PLASTICS DRUM FOR CONCRETE MIXING AND METHODS OF MANUFACTURE THEREOF, which is a continuation of co-pending PCT International Application No. PCT/AU00/011226, having an International filing date of Oct. 9, 2000, and having a priority date of Oct. 8, 1999 and entitled "VEHICLE MOUNTED PLASTICS DRUM FOR CONCRETE MIXING AND METHODS OF MANUFACTURE THEREOF, the full disclosures of which are incorporated by reference.

BACKGROUND

The building industry makes widespread use of concrete mixing trucks for transportation of ready mixed concrete to sites for concrete pours. These trucks typically comprise a large mixing assembly including a mixer drum mounted to the vehicle and which is connected to a mixer drive for mixing concrete contents during transportation and for discharge of the contents on site. The drive system comprises a gear box which takes power from the vehicle motor and which applies a mixing torque to the drum imparting axial rotation to the drum with the torque being adjustable depending upon the operating requirements. The above general arrangement is described in U.S. Pat. No. 4,585,356 which discloses a concrete mixer truck having a mixer drum adapted to be rotated by the traction motor of the vehicle through an auxiliary transmission of the traction motor transmission.

According to the known vehicle mounted mixing assemblies, the mixing drum is typically of heavy duty steel construction and is disposed at approximately 10 to 15 degrees from horizontal. The drum is fitted with internal vanes or mixing blades defining an archimedian spiral so that as the drum rotates in a first direction the concrete held therein is mixed and as the drum is rotated in the opposite direction, the concrete is discharged from the drum via an elevated discharge orifice under the reverse action of the internal spiral vanes. The drum is disposed such that the drive end is lowest and the discharge end is highest relative to a generally horizontal plane of the vehicle.

While steel drums have been in use for many years, they suffer from a number of attendant disadvantages, relating to their cost of manufacture and replacement, working life, wear characteristics, weight and volume.

Steel drums are expensive to manufacture due to their labour intensive construction which involves rolling steel sheets into conical portions and cylinders which once fabricated are then welded to form the finished tank. The archimedian spirals formed from flat sheets are then welded into position inside the drum. As concrete is a highly abrasive material, internal surfaces of steel drums are subject to significant wear abrasion. This occurs particularly on the surfaces which take slump impact, sliding friction and shear load leading to eventual wearing out of the drum.

Typically, a steel drum used every day might last three to five years, thereafter requiring replacement at significant cost. The abrasion of internal surfaces is increased where there are changes in slope in the drum walls usually where the segments of the drum are joined.

The mixing blades are welded to the internal surface of the drum causing sharp angled recesses in which concrete can gather and eventually build up degrading the internal surface and providing a catchment for further unwanted build up of concrete. By its nature, a steel surface is relatively smooth and whilst this may be desirable for the purpose of preventing concrete build up on the walls of the drum, the interface between the concrete and steel wall is an area of abrasion rather than concrete mixing.

Ideally, mixing of concrete should take place throughout the whole mix, but in the steel drums, optimum mixing does not take place at the boundary layer and in crevices in which concrete may collect. In fact, due to the nature of the frictional interface between the steel surface and concrete boundary layer, laminar flow occurs resulting in little or no mixing at the boundary layer. The reason for this is that the aggregate in the concrete slides and abrades (with reduced or no mixing) rather than rotates to facilitate mixing. Thus there are 'dead' spots in the mix where no mixing takes place and where there is an increased potential for unwanted collection of concrete. In addition to the above problems associated with the use of steel mixing drums, there are cost and weight factors which add to inherent inefficiencies in use of steel drums. Due to the dead weight of the steel drum, its volume must be restricted so the combination of the dead weight and concrete weight must be maintained within the maximum allowable loading limits for the vehicle to which the drum is attached. The inventor considered the possibility of using a lightweight material such as plastics for construction of a concrete mixing drum as a substitute for steel whilst recognizing that there were numerous structural and manufacturing difficulties to be overcome in making the transition to plastics not the least of which was the production of a drum which could withstand the high static and dynamic loadings to which truck mounted mixing drums are subject to in normal operation. If the weight of the drum could be reduced without compromising and possibly increasing drum volume the weight reduction could be taken up with additional concrete thereby increasing the pay load.

SUMMARY OF THE INVENTION

The present invention seeks to provide an alternative vehicle mounted rotating cement or concrete mixing drum fabricated from plastics materials which overcomes the aforesaid disadvantages of the prior art and which not only improves the concrete mixing characteristics but prolongs the life of the drum in comparison to its steel equivalent and allows an increase in concrete carrying capacity of the drum commensurate with the reduction in drum dead weight thereby resulting in an increase in pay load for potentially each vehicle journey and without breach of the boundary requirements of the vehicle.

In the broadest form of the apparatus aspect the present invention comprises; a heavy duty rotary concrete mixing drum capable of attachment to a vehicle; the drum comprising a first end which engages a vehicle powered drive assembly which rotates said drum for mixing of said concrete and a second end from which mixed concrete is discharged; wherein said drum is manufactured from at least one layer of plastics material; wherein the drum includes a wall having integral internal formations which promote mixing and discharge of said concrete and an inner surface which promotes mixing of the concrete.

In one broad form of the apparatus aspect the present invention comprises: a vehicle mounted rotary concrete mixing drum having an opening at one end for receiving and discharge of concrete therefrom and at the other end means for engaging a drive assembly so as to rotate the drum for mixing or discharging concrete; wherein, the drum is manufactured from at least one mold using at least one plastics material; wherein the drum further includes detachable or integrally attached vanes which outstand from the internal surface of the drum forming an archimedian spiral disposed such that when the drum is rotated in a first direction. The concrete contents are mixed and when the drum is rotated in a second direction the contents are discharges from said drum; and wherein the internal surface of the drum is formed or lined with an elastomer which causes mixing of the contents of the concrete at the concrete boundary layer; and wherein the weight of the drum is such that when full, the total weight of the drum and contents is lighter than for a steel drum of an equivalent size when full.

In another broad form of the apparatus aspect, the present invention comprises:

a vehicle mounted rotary concrete mixing drum having an opening at one end for receiving and discharge of concrete therefrom and at the other end means for engaging a drive assembly so as to rotate the drum for mixing and discharging concrete; wherein, the drum is manufactured from two or three molds using at least one layer of plastics material; wherein the drum further includes detachable or integrally attached vanes which outstand from the internal surface of the drum forming an archimedian spiral disposed such that when the drum is rotated in a first direction the concrete contents are mixed and when the drum is rotated in a second direction the contents are discharged from said drum; and wherein the internal surface of the drum comprises a polyurethane layer to enhance mixing of the contents of the concrete at the concrete boundary layer; and wherein the weight of the drum is such that when full, the total weight of the drum and contents is lighter than for a steel drum of an equivalent size when full.

In another broad form of the apparatus aspect, the present invention comprises:

a vehicle mounted rotary concrete mixing drum having an opening at one end for receiving and discharge of concrete therefrom and at the other end means for engaging a drive assembly so as to rotate the drum for mixing or discharging concrete; wherein, the drum is manufactured from two or three molds and comprises a first plastics material such as woven fiberglass forming an outer surface of the drum and a second plastics material such as polyurethane or like elastomer forming an inner surface of the drum; wherein the outer and inner surfaces together form a wall of the drum and wherein the drum further includes detachable or integrally attached vanes which extend inwardly from the wall of the drum forming an archimedian spiral disposed such that when the drum is rotated in a first direction, the concrete contents are mixed and when the drum is rotated in a second direction the contents are discharged from said drum; and wherein the inner polyurethane surface of the drum provides wear resistance and enhances mixing of the contents of the concrete at the concrete boundary layer, and wherein the weight of the drum is such that when full, the total weight of the plastics drum and contents is lighter than for a steel drum of an equivalent or smaller size when full.

In a broad form of the method aspect the present invention comprises a method of manufacture of a vehicle mounted plastics concrete mixing drum comprising the steps of:
a) preparing a mold having a surface defining an internal profile of said drum which includes a wall having recesses which provide a mold part for continuous helical mixing blades included in said drum:
b) applying a release agent to an outer surface of said mold;
c) applying over said release agent a plastics layer in liquid form and allowing said plastics layer to set against the mold so as to form a first layer of a wall of said drum;
d) applying a bonding layer to said plastics layer;
e) applying a fiber reinforced composite layer to said bonding layer; and
f) removing the mold from the interior of said drum.

A method of manufacture of a vehicle mounted plastics concrete mixing drum comprising the steps of:
a) taking a male mold defining an internal profile of said drum including a wall having recesses which form a continuous helical mixing spiral:
b) applying a release agent to an outer surface of said mold;
c) applying over said release agent an elastomer in liquid form and allowing said elastomer to polymerise against the mold so as to form a first layer of a wall of said drum;
d) applying a bonding layer to said elastomer;
e) applying a filament fibre reinforced composite layer to said adhesive layer;
f) winding said filament about said drum to form an outer fibre reinforced structural matrix.

According to another broad form of the method aspect, the present invention comprises:
a method of manufacture of a vehicle mounted plastics rotatable concrete mixing drum comprising the steps of:
a) taking a male mold part whose external surface defines an internal profile of a concrete mixing drum;
b) applying a release agent to an outer surface of said mold part;
c) applying over said release agent an elastomer in liquid form and allowing said elastomer to polymerise against the mold so as to form a first layer of said drum;
d) applying a bonding agent to said elastomeric layer as a substrate coupling layer to receive an outer structural layer of filament;
e) winding said filament about said drum to form an outer structural matrix.

According to another broad form of the method aspect the present invention comprises:
a method of manufacture of a vehicle mounted concrete mixing drum comprising the steps of:
a) fabricating base mold sections for receiving plastics material used in the formation of said drum;
b) assembling said base sections mold sections on a mandrel;
c) clamping said mold sections together to form a helical groove about said mold sections;
d) applying a plastics material to the outside of said mold sections whereby the plastics material forms an interior layer of said drum;
e) applying an intermediate adhesive layer to the outside of said interior layer;
f) applying to said adhesive layer a fibre reinforced outer structural layer wound about said mold sections wherein said interior, intermediate and outer layers form a wall of said mixing drum.

Preferably said mold parts are clamped together prior to application of said interior layer via aligning dowels and an adhesive.

According to a preferred embodiment, the drum is manufactured from three molded parts two of which comprise end parts of the drum and a third comprising a central part for location between said end parts. Each mold part has a formation which imparts to the drum part formed by the mold part, a part spiral extending inwardly from the wall of the drum part such that when the drum parts are engaged together, an internal archimedian spiral is formed. The molds are configured such that when the molds are mated together, the internal archimedian spiral used for both mixing and discharge of concrete from the drum is complete. Preferably, the outer mold surfaces are prepared with a release agent so the mold may be readily removed after curing. Preferably the elastomer is polyurethane and has a surface property which reduces abrasion yet enhances mixing. Preferably there are three mold sections in which the junctions form part of the mixing spirals such that the sections are joined along the spirals.

BRIEF DESCRIPTION OF THE DRAWINGS

The present invention will now be described according to a preferred but non limiting embodiment and with reference to the accompanying illustrations wherein:

FIGS. 5a-d show the first stages of preparation of the drum.

FIGS. 7a-c show an end elevation view of the mold clamping and inflation steps.

FIG. 8 shows the mold and drum stored for demolding.

FIG. 9 shows a drum inside a grit chamber in which a grit jet is traversed over the shell surface to prepare the surface so it is chemically receptive to the bonding of the next stage.

FIG. 10 shows the drum mounted for rotation on a computer controlled winding machine.

FIGS. 11a-b show a two step process for application of a gel coat.

FIG. 12 shows the drum adapted with a stiffening ring which distributes loads from trunion rollers incorporated on the vehicle on which the drum is to be mounted.

FIG. 13 shows the orientation of the drum during application of the drip ring.

FIGS. 18a-f show the various steps in the construction of a solid core blade according to an alternative blade arrangement.

FIGS. 19a-p show the various stages of construction of a drum according to a preferred embodiment.

FIGS. 20a-f show steps on the construction of a solid core helical blade according to an alternative embodiment.

DETAILED DESCRIPTION OF EXAMPLE EMBODIMENTS

Figure 1:
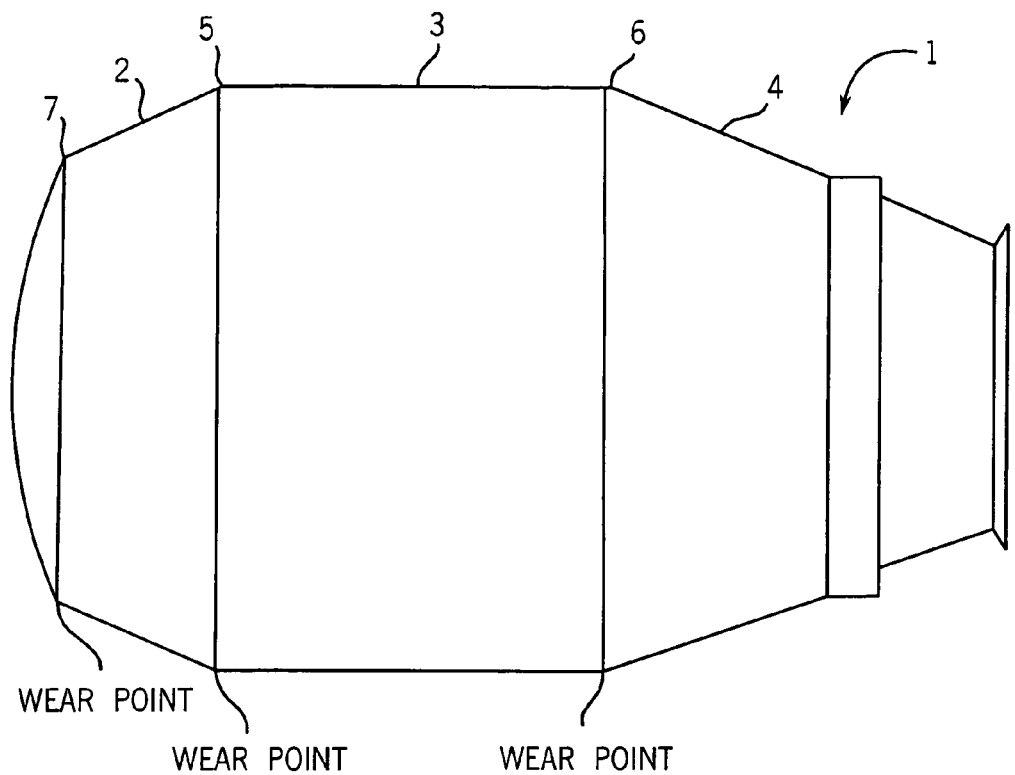
FIG. 1 shows a side elevation of a prior art mixing drum.

FIG. 1 shows an elevation view of a known steel mixing drum 1 which is typically constructed from separate prefabricated sections 2, 3 and 4 which are welded together at seams 5, 6 and 7. At seams 5, 6 and 7 the welded joints which are subject to concentrated wear due to the change in surface direction at the joint. The concentrated wear points in the prior art steel drums reduces the working life of the drums necessitating costly repair or replacement. Steel drums are fabricated from rolled flat sheets which form cones and a cylinder which are then joined together by welding. Archimedian spirals are then welded to the inner surface of the drum resulting in a high specific gravity vessel whose self weight reduces the amount of concrete which can be carried by the vehicle to which it is attached. As previously indicated, the steel drums suffer from a number of disadvantages including susceptibility to abrasion at the junctions of the cylindrical and conical sections and the tendency for unwanted concrete build up at the sharp corners and crevices formed by the mixing blades. In addition, the smooth internal surface of the steel drum promotes sliding abrasion and inhibits mixing at the boundary layer due to the low coefficient of friction at the concrete/metal interface.

Figure 2:
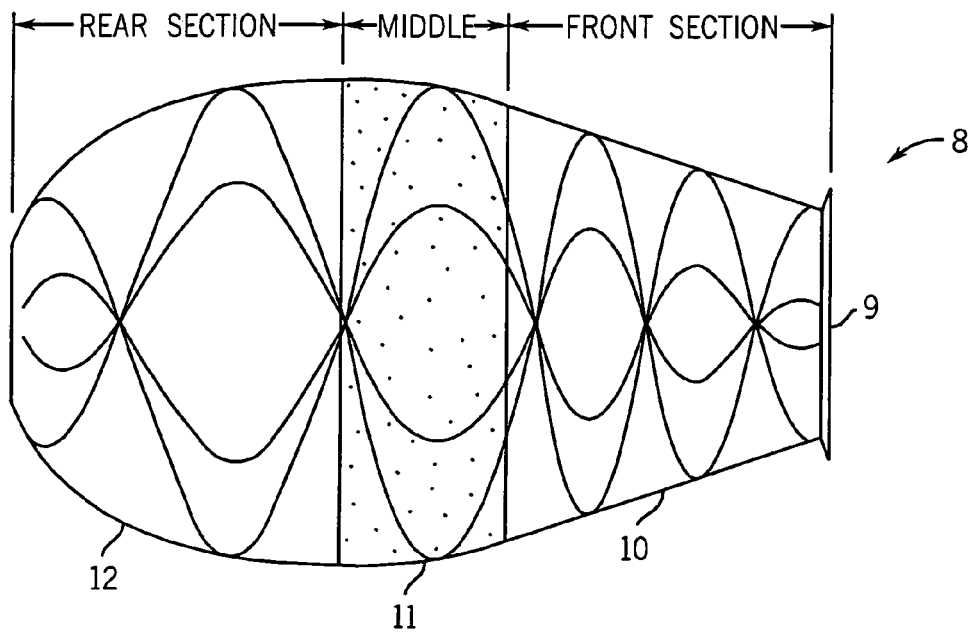
FIG. 2 shows a side elevation of a cement mixing drum according to one embodiment of the invention.
Figure 3:
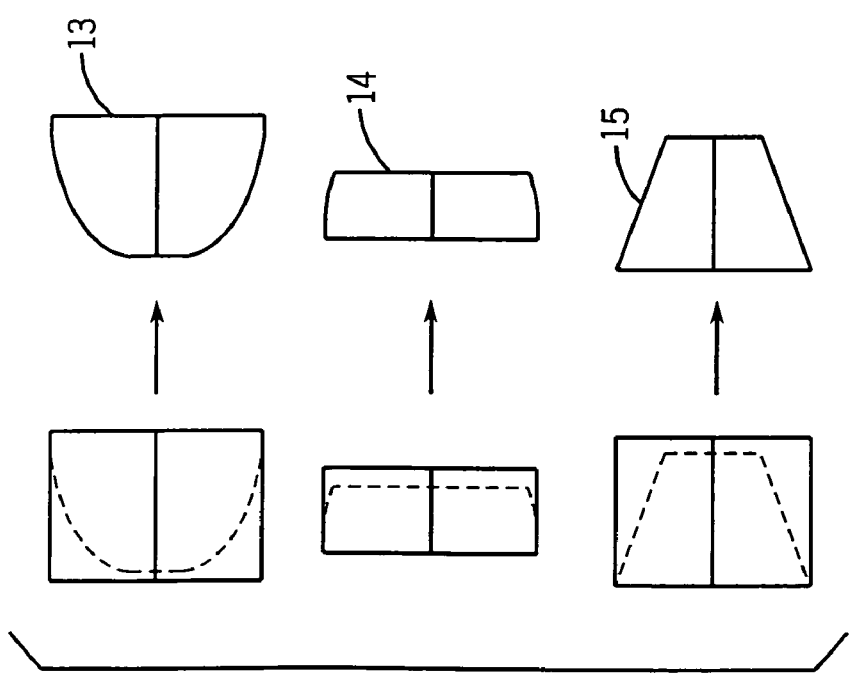
FIG. 3 shows three mold parts to be joined in making a drum.

FIG. 2 shows an external profile of a fibre reinforced composite concrete mixing drum 8 according to one embodiment of the invention. The drum includes an internal archimedian spiral formed by helical blades or vanes which mix concrete during rotation of the drum in one direction and discharge concrete when the drum is rotated in an opposite direction. The drum is generally pear shaped and includes an opening 9 at one end for entry and discharge of concrete. The arrangement of FIG. 2 is arrived at by application of the method aspect of the invention which will be described in detail below. Drum 8 is constructed from a fibre reinforced plastic structural shell with an elastomeric interior having a surface property which imparts abrasion resistance to the concrete but increases the mixing at the boundary layer of the concrete and drum wall by forced rotation of aggregate. A preferred method of construction of the drum will now be described in detail. Whilst the embodiment described employs three mold parts it will be appreciated that the drum may be constructed from a lesser or greater number of parts. It has been found however, that a three part construction is preferable in view of the shape of the finished drum. According to one embodiment, drum 8 is constructed from three mold sections 13, 14 and 15 (shown in FIG. 3) which form portions 12, 11 and 10, respectively, of drum 8. FIG. 3 shows typical profiles of mold sections 13, 14 and 15. Portion 12 of drum 8 is constructed to engage a drive system mounted on a vehicle for rotating the drum. Portion 11 extends between portions 12 and 10. Portion 10 includes a discharge opening through which mixed concrete is discharged. The first step in the construction of the mixing drum is the preparation of the mold from which the drum will be produced. The mold is preferably constructed in three parts as this enables ease of extraction form mold formers and also allows for the formation of mixing drums of different sizes according to requirements. For instance the length of the drums can be increased by changing the size of intermediate section 14. Mold sections 13, 14 and 15 are each formed in separate molds from expanded polystyrene beads.

Steam heat is applied through slots in each mold thereby fusing the beads against the mold surface. The polystyrene surface finish of the mold may be improved by the application of a fast drying liquid. The external profile of the mold parts when joined provide the mold for the inner surface of the drum. The mold profile includes helical grooves which are the inverse of helical mixing blades which extend from an inner surface of the finished drum. The mold and partially finished drum are shown at 16.

Figure 4:
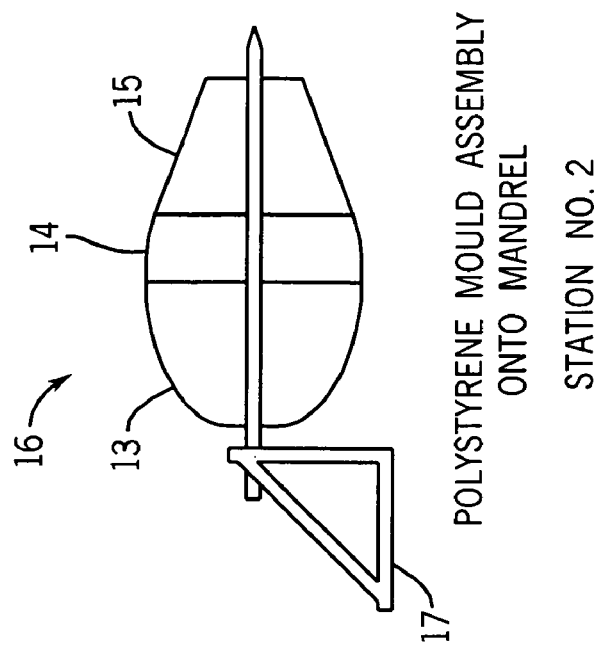
FIG. 4 shows the mold sections of FIG. 3 assembled onto a mandrel.

FIG. 4 shows an assembled mold mounted on a cantilevered mandrel 17. The mold sections include mating dowels which align corresponding parts of the mold profiles and are clamped together with an adhesive. FIGS. 5*a-d* show the first stages of preparation of the drum. At the commencement of this stage the mold is mounted on mandrel 17 which is capable of axial rotation. The operation of the mold is computer controlled and employs a robot which rotates the mandrel. The mold surface is prepared with a release agent which will enable release of the mold from the drum on completion of the method steps. A spray head 18 delivers a polyurethane elastomer to the surface of the mold which forms an inner layer of the drum.

Figure 18G:
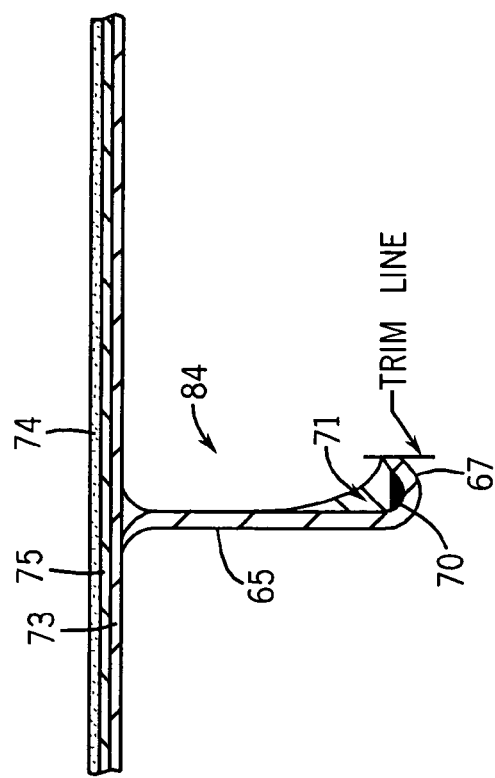
FIG. 18g is a fragmentary sectional view of a drum according to an alternative embodiment.

The spray is applied normal to the surface of the drum which will at this stage be rotating according to parameters fed into the computer. As the mold rotates on the mandrel the spray head moves to follow the mold surface and in particular the path of the grooves. A computer program controls the delivery of the polymer to the mold surface. The application of the polyurethane elastomer to the surface of the mold takes place in two stages. First, the spray is applied to the grooves of the mold which will form the helical blades of the drum. Spray head 18 follows the contour of the helix about the mold and deposits a uniform coating onto the sides of the blades with an additional thickness deep in the groove which will form the helical spiral blade tip. The additional material provides abrasion resistance during operation. In the second part of the spray operation, spray head 18 is changed to spray the polyurethane elastomer normal to the surface of the mold according to the required thickness. Additional polyurethane may be sprayed where additional thickness is required in areas of high wear. If required, multiple coats may be deposited in one or both stages. According to one embodiment as shown by FIG. 18*g*, one or more of any additional layers, such as intermediate layer 75, may be differently colored to provide wear indicators. A white pigment in the surface layer may be provided for cleaning and inspection after use. The polyurethane is allowed to gel following which a chemical layer is sprayed onto the polyurethane surface to ensure bonding with the next fibre reinforced composite layer.

Figure 6:
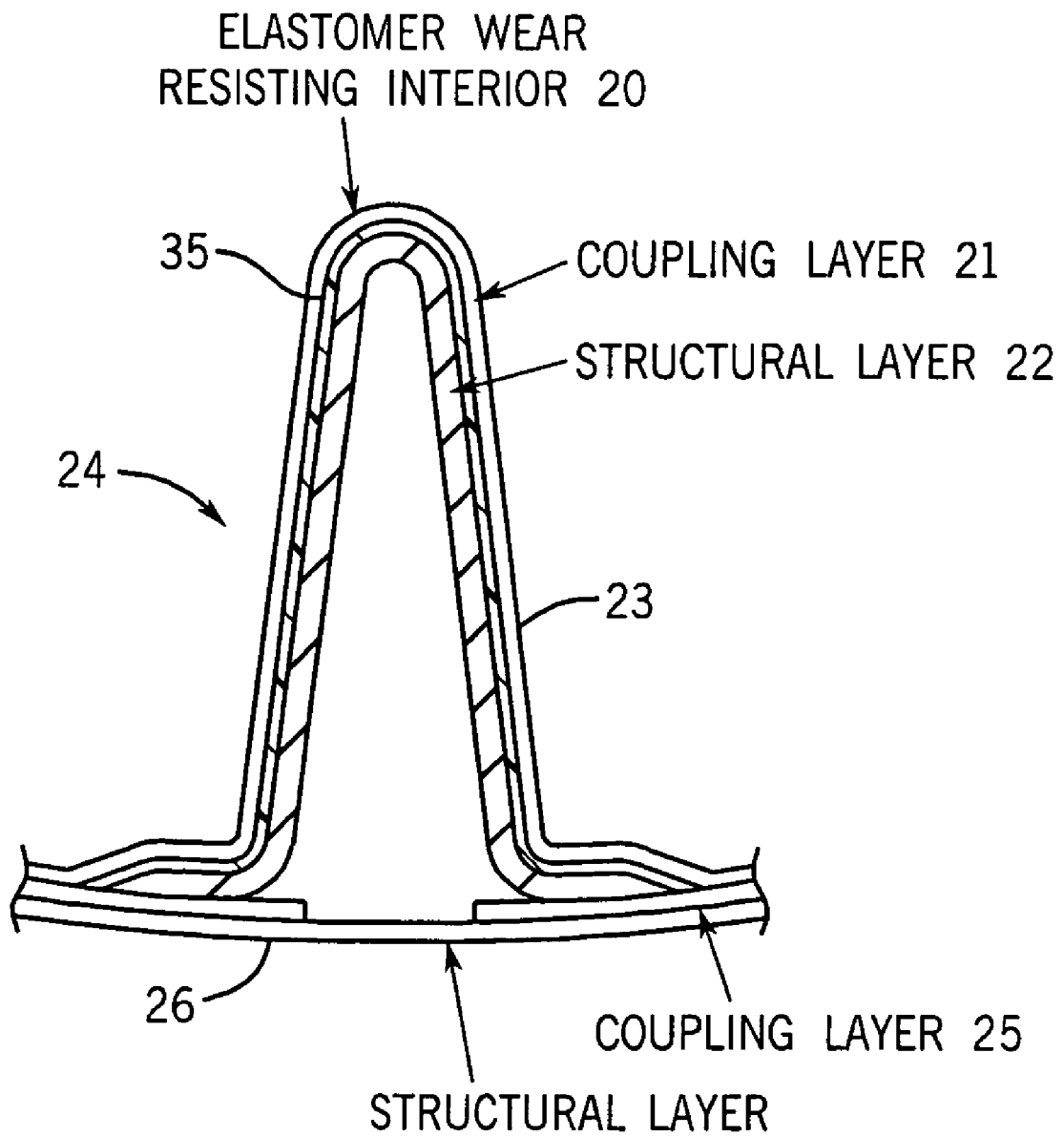
FIG. 6 shows an enlarged profile section of a typical mixing blade.

Prior to application of the fibre reinforced layer, a rope formed of multiple glass fibre strands is delivered from a dispensing creel into the grooves of the spiral helix. This part of the operation is represented by FIG. 5*d*. The rope is drawn through a bath of resin and is lead through a guide eye to fall into the blade groove. Tensioning of the rope pulls it into the groove. When the rope hardens it becomes a high strength reinforcing bar along the full length of the helical spiral. The polyurethane which is sprayed onto the mold by this stage generally conforms to shape of the mold except for bridging that is required between the groove walls. In the example of FIG. 6, there is shown an enlarged profile section of a typical mixing blade 24. Each blade comprises an elastomeric layer 20 which forms the inner surface of the drum. A coupling layer 21 is applied over the elastomeric layer following which a structural layer 22 is applied inside the concave recess 23. This process is completed for each section of spiral at a join whereupon, a further coupling layer 25 is applied to the remainder of the outer surface of the drum over which is applied a structural layer 26 which is preferably a fibre reinforced composite to form a structural shell. Included deep inside recess 23 is a continuous filament and resin rope 35.

A rigid shell is required to bridge across the helical groove and this is provided by sprayed composite resin and chopped glass strands completing the structural layer 26. The sprayed resin is hand rolled followed by clamping then inflation of the mold before the polyurethane has gelled. FIGS. 7*a-c* show an end elevation view of the mold clamping and inflation steps. FIG. 7*a* shows the clamping assembly 30 in the open configuration. Mold and partially completed plastics drum is represented by broken line 31. Before the composite of resin and chopped glass strands has gelled the mold is located on clamp assembly 30 whereupon arms are closed over the composite. As shown in FIG. 5*c*. After clamping, the mold is inflated to ensure complete contact with the fibre reinforced composite layer. The mold and drum 31 are stored for four hours until the resin is sufficiently cured for the next stage. FIG. 8 shows the mold and drum 31 stored for demolding. FIG. 9 shows drum 31 inside grit chamber 32 in which a grit jet is traversed over the shell surface to prepare a surface which is chemically receptive to the bonding of the next stage. The next step involves filament winding of a fibre reinforced structural layer. A winding arrangement as shown in FIG. 10 is arranged to wind resin wetted fibre rovings around a rotating former. The tensile strength of the windings which may be in the order of 600 Mpa. FIG. 10 shows drum 31 mounted for rotation on a computer controlled winding machine to enable winding of glass ravings 34. To obtain the optimum physical properties of the filament wound structure the fibres are aligned to the loads imposed in use of the finished drum. Typical loadings on the drum are axial bending under weight of wet concrete, an applied dynamic load at the drive end of the drum, driving torque and support loads at the discharge trunion rolls. The winding pattern of the filaments aligns the fibres at 10 degrees at mid span to withstand bending stresses, increasing in angle and in wall thickness towards the discharge end to accommodate applied roller loads.

According to one embodiment the winding machine has three motor drives which rotate mandrel 17, move carriage parallel to the mandrel axis and a third motion at right angle to this. The rovings which line the drum are drawn through the resin bath and applied to the surface of the drum as a wide ribbon comprising thousand of tensioned fibres. The composite is applied by winding filament about the drum over the coupling layer 25 to form a fibreglass matrix with high strength properties sufficient to withstand normal operating loads applied during mixing and transporting concrete. The windings overlap until the required thickness is reached. The surface of the drum is covered with wet resin and small irregularities which need to be addressed to provide the external finish. As a result of this construction, the spiral mixing blades inside the drum are hollow with high bending and shear resistance during mixing operations. The inner elastomeric surface is highly resistant to abrasion by concrete yet it is softer and lighter than the steel equivalent. The higher resistance to abrasion is facilitated by the natural elastic deformation of the elastomer which absorbs the kinetic energy of the concrete particles without gouging of the surface material. In addition, due to the property of the inner surface which will preferably be polyurethane, the concrete will be mixed rather than slide at the boundary layer ensuring efficient mixing of the concrete throughout the mix and reduction of abrasion due to the smooth curves throughout the interior of the drum. In a further step, the structural layer is finished with a smooth pigmented resin which is applied utilising a clamp similar to that used for completion of the resin layer.

FIGS. 11a and b show a two step process for application of a gel coat. Shell 40 is larger than shell 30 to accommodate the additional layer of the windings. As shown in FIG. 12 drum 31 is adapted with a stiffening ring 43 which distributes loads from trunion rollers incorporated on the vehicle on which the drum is to be mounted. This stage allows application of a corporate livery or alternative indicia into the structure of the finished drum. To achieve this shell parts 41 and 42 are printed with a selected livery and sprayed with a background gel coat. After gelation a light layer of reinforced composite is applied and allowed to set. The shells re prepared in advance of the operation of application of the fibreglass windings while the resin is still liquid whereupon the shells are clamped around the windings thereby extruding out any excess resin. The shell mold assembly is mounted vertically and a two part compound is injected into the track ring mold space.

FIGS. 13a-c show the orientation of the drum 31 during this step. Once the resin has gelled, the shell molds are removed and the discharge end overwind is trimmed and a polyurethane drip flange is bonded at the discharge end. The final step involves removal of the mold remaining inside the drum followed by closure of the mandrel hole and cosmetic finishing. The mandrel is removed and the hole fitted with a pipe connection. The drum is stood vertically and acetone which dissolves the polystyrene is pumped into and out of the interior which is then cleaned and washed. The drum is then finished by removal of any resin flash.

Figure 14:
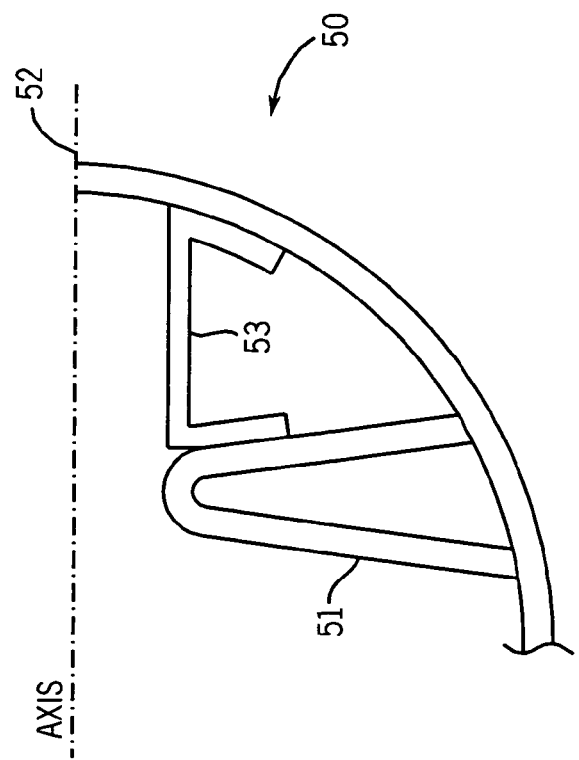
FIG. 14 shows a cross section of an end region of a drum including between spiral section and wall a baffle imparting rigidity to the drum.
Figure 15:
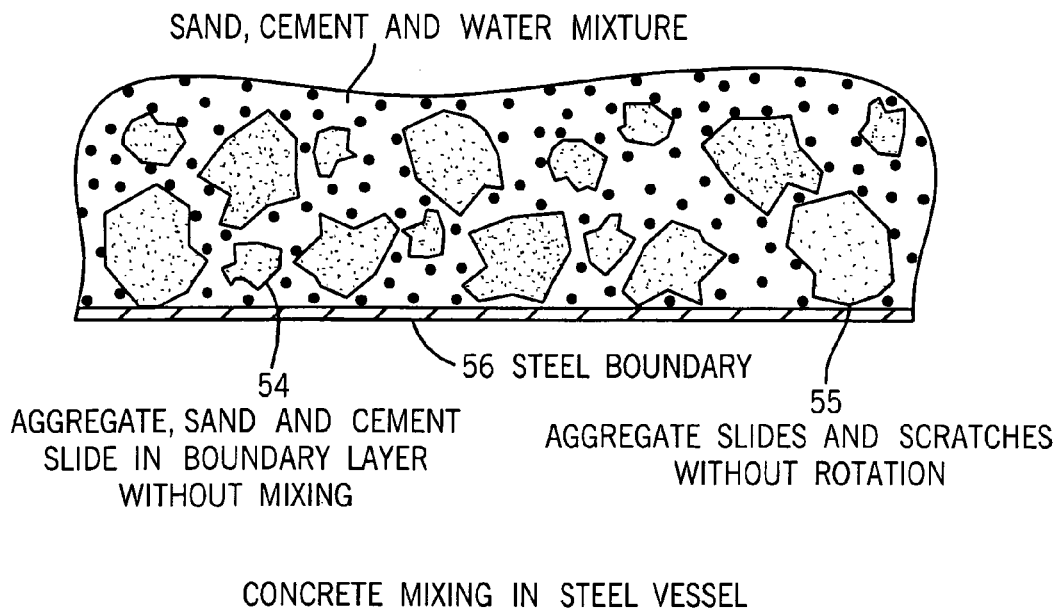
FIG. 15 shows a cross section of a typical interface between a concrete mix and a steel wall.
Figure 16:
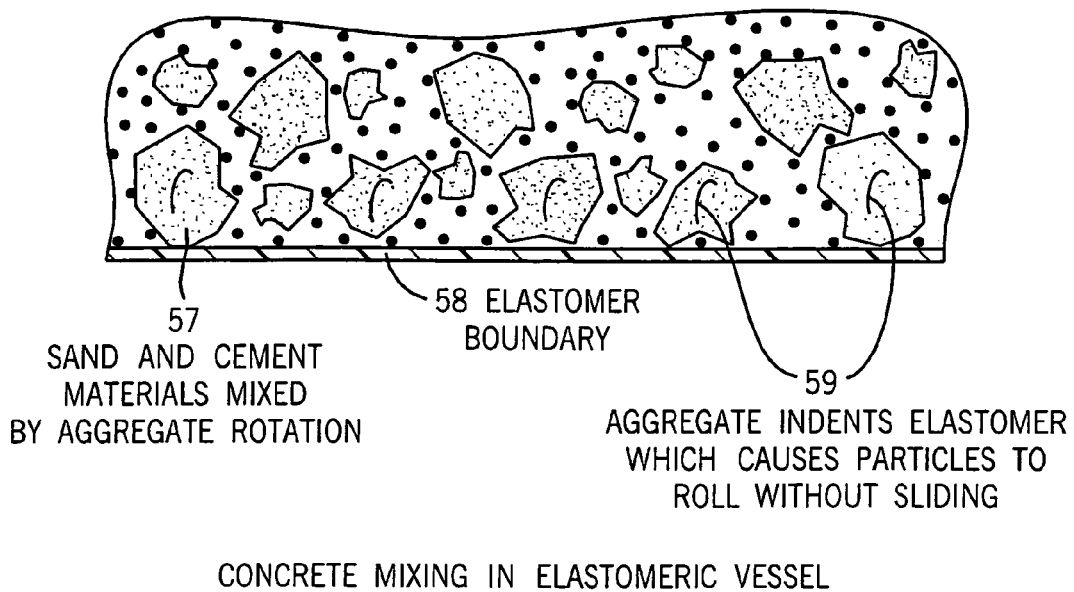
FIG. 16 shows an enlarged view of the boundary layer wall/concrete interface in a plastics mixing drum according to a preferred embodiment of the invention.

FIG. 14 shows a cross section of an end region of a drum 50 including between spiral section 51 and wall 52 a baffle 53 imparting rigidity to the drum. The battle plate is preferably glued into position. FIG. 15 shows a cross section of a typical interface between a concrete mix 54 and a steel wall 55. Due to the inherent smoothness of the steel surface 56 the concrete tends to slide and abrade rather than mix FIG. 16 shows a cross section of a typical interface between a concrete mix 57 and an elastomeric boundary layer 58. As shown by arrows 59 the aggregate in the mix rotates due to the friction between concrete 57 and surface 58. The rotation avoids excessive abrasion of the surface 58 and enhances concrete mixing. Furthermore, as surface 58 is able to deflect, energy is dissipated by the inherent elasticity of the surface contributing to the reduction in wear. According to the preferred embodiment, the spiral blades inside the drum range varying between 0.5 and 2 meter pitch. At the drive end of the drum the spirals are approximately 2 meter pitch. The blades are reinforced by chopped strand, woven cloth or filament winding. The molds may allow for a variety of helix pitches of the blades. Preferably, the radius of the root of the blade is greater than 10 mm to avoid unwanted accumulation of set concrete. Furthermore, the blades are strengthened by their molding integrally with the wall of the drum and have a stiffness factor which will sustain all applied normal operating loads. In an alternative embodiment, the internal blades may be detachably fixed to the wall of the drum.

An alternative method for construction of a fibre reinforced drum is shown in FIGS. 17a-o. FIG. 17a shows a profiles of half mold part 60 which is coupled with a corresponding half to form completed mold 61. The first step in the construction of the mixing drum is the preparation of the mold from which the drum will be produced. The size of the drum may be changed by changing the dimensions of the mold. Mold sections are each formed from separate molds from expanded polystyrene beads. Steam heat is applied through slots in each mold thereby fusing the beads against the mold surface. The external profile of the mold parts when joined provide the mold for the inner surface of the drum. The mold profile includes helical grooves which are the inverse of helical mixing blades which extend from an inner surface of the finished drum.

Figure 17G:
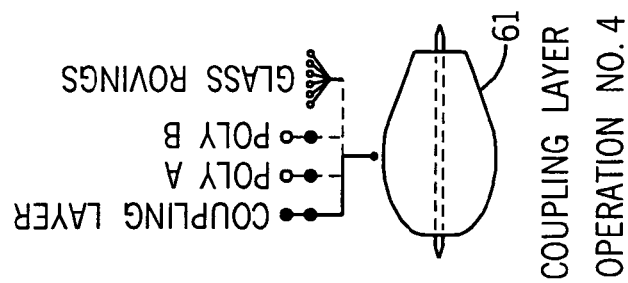
FIGS. 17a-o show the various stages in construction of a drum according to an alternative embodiment.

FIG. 17b shows an assembled mold mounted on a cantilevered mandrel 62. The mold sections include mating dowels which align corresponding parts of the mold profiles and are clamped together with an adhesive. FIG. 17c shows mold 61 at a stage during which the polystyrene surface finish of the mold may be improved by the application of a fast drying liquid. FIGS. 17d-g show the first stages of preparation of the plastics drum according to the embodiment to be described. The mold is mounted on mandrel 62 which is capable of axial rotation. The operation of the mold is computer controlled and employs a robot which rotates the mandrel. The mold surface is prepared with a release agent which will enable release of the mold from the drum on completion of the drum. A spray head 63 delivers a polyurethane elastomer to the surface of the mold which forms an inner layer of the drum.

Figure 17F:
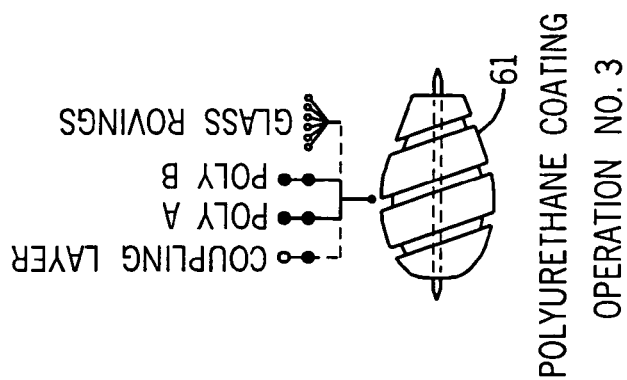
Figure 17E:
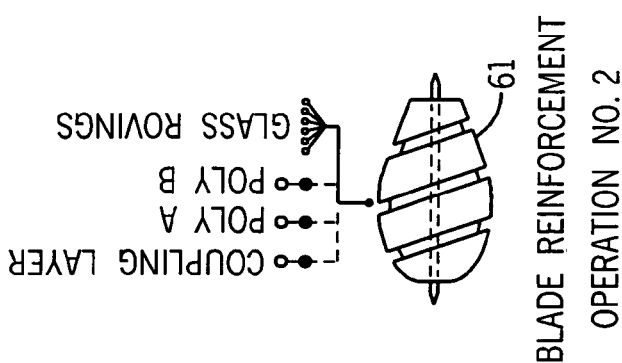
Figure 17D:
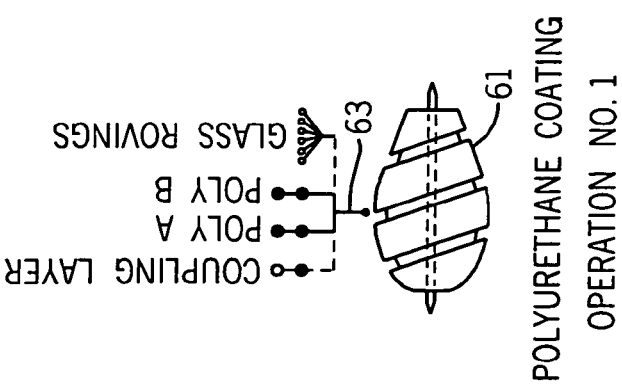
Figure 21:
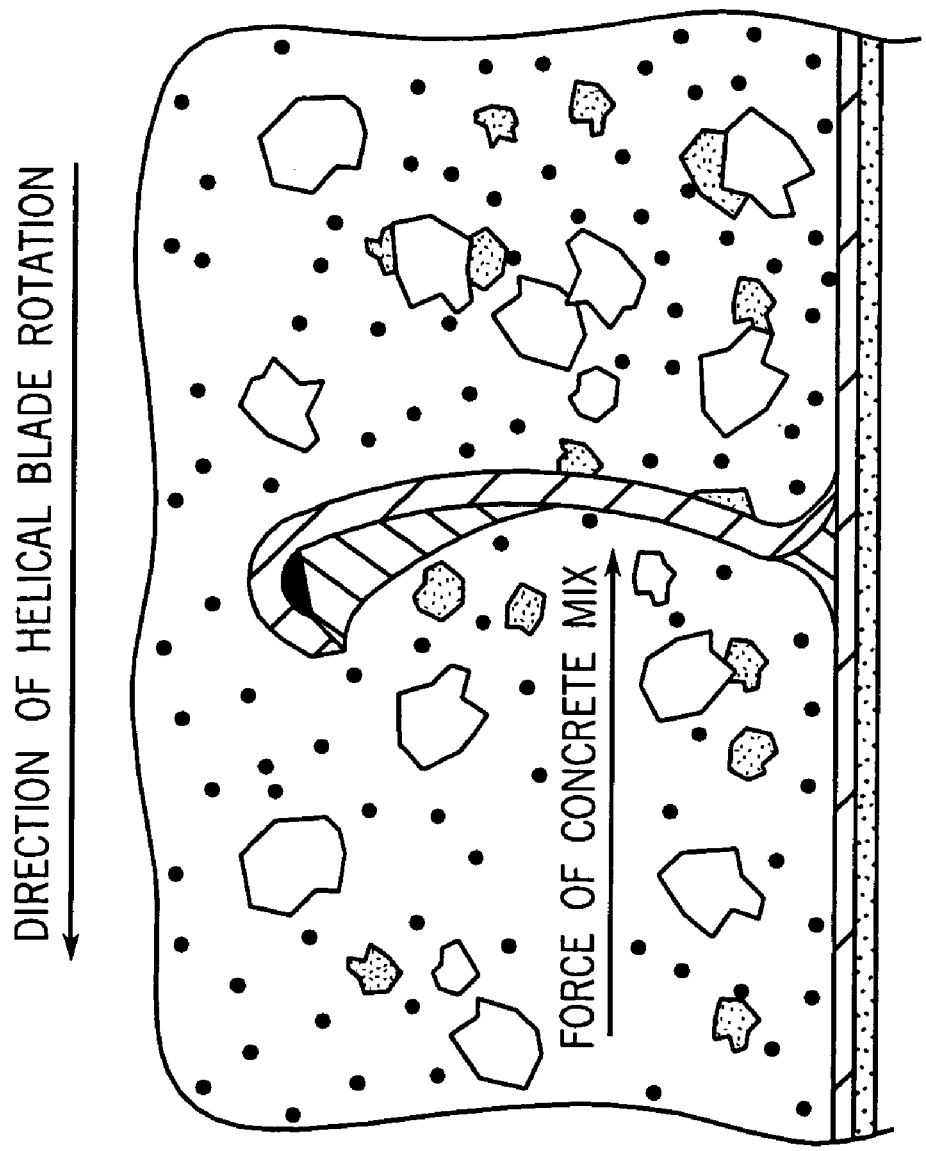
FIG. 21 shows a cross sectional view of a solid core blade interaction with concrete during rotation of the drum.

The spray is applied normal to the surface of the drum which will at this stage be rotating according to parameters fed into the computer. As the mold rotates on the mandrel the spray head moves to follow the mold surface and in particular the path of the grooves. The application of the polyurethane elastomer to the surface of the mold takes place in two stages. First, the spray is applied to the grooves of the mold which will form the helical blades of the drum. FIGS. 18a-f show the various stages of construction of a solid core blade arrangement according to an alternative embodiment. Spray head 63 follows the contour of the helical groove 64 about the mold and deposits a uniform coating of polyurethane 65 against wall 66 terminating in the region of groove bottom 67. The layer applied includes a return portion 68 which provides a bed 69 into which is laid continuous glass fibre reinforced elastomer 70. Return portion 68 will form the helical blade tip and this will be strengthened by the glass fibre elastomer 70. FIG. 18c shows an additional layer of polyurethane 71 sprayed over glass fibre elastomer 70 thereby completing the blade profile. The additional material strengthens the blade. In a second part of the spray operation, spray head 63 is changed to spray the polyurethane elastomer normal to the surface of the mold according to the required thickness. Additional polyurethane may be sprayed where additional thickness is required in areas of high wear. If required, multiple coats may be deposited in one or both stages. To ensure that the solid core blade profile is retained during the second spraying operation, the cavity formed by helical groove 64 is covered by polyurethane mold insert 72 as shown in FIG. 18d. A layer of polyurethane 73 is then sprayed over insert mold 72 and also over the outside of drum 61. This is followed by the application of a chopped glass layer 74. FIG. 17e represents the stage of blade reinforcement and preparation and FIG. 17f represents the stage of application of the polyurethane coating over the outside of the drum following completion of the blade profile. According to one embodiment as shown by FIG. 18g, one or more of any additional layers, such as layer 75, may be differentially colored with to provide wear indicators. A white pigment in the surface layer may be provided for cleaning and inspection after use. The polyurethane is allowed to gel following which a chemical layer is sprayed onto the polyurethane surface as represented by FIG. 17g to ensure bonding with the next fibre reinforced composite layer. A coupling layer is applied to the remainder of the outer surface of the drum over which is applied a structural layer which is preferably a fibre reinforced composite to form a structural shell. A rigid shell is required and this is provided by sprayed composite resin and chopped glass strands completing the structural layer. The sprayed resin is hand rolled followed by clamping as shown in FIGS. 17 i, j and k.

FIGS. 17j and k show the clamping assembly 80 in the open and closed configurations respectively. Mold and partially completed plastics drum 81 is shown in FIG. 17j. Before the composite of resin and chopped glass strands has gelled the mold is located on clamp assembly 80 whereupon arms 82 and 83 are closed over the composite layer. After clamping, the mold may be inflated to ensure complete contact with the fibre reinforced composite layer. The mold 61 and drum 81 are stored for four hours until the resin is sufficiently cured for the next stage. Casting of a track ring and application of a drip flange area as previously described. The inner mold is removed as previously described and this includes removal of mold insert 72. FIG. 18f shows a typical solid core blade profile 84 as described above. The blade satisfies strength requirements and is reinforced by curves in the blade profile as the blade traverses the helix about the finished drum interior. Preferred material of construction for the solid core blade will be sprayed SP85 polyurethane elastomer (85 shore A). Preferred reinforcing of the solid blade is high tensile glass fibre CC60 elastomer. Preferably, the tensile reinforcement is continuous along the length of the blades.

FIGS. 19a-p show an alternative method of construction of a plastics drum including an injection molding step. A number of the steps according to this embodiment are substantially the same as for the corresponding steps described with reference to FIGS. 17a-o.

The methods, however differ firstly in relation to the method of construction of the helical blade. FIGS. 19a-e show a mold 90 mounted on mandrel 91 in the usual manner. Blade reinforcement operation represented by FIG. 19e is shown in more detail in FIGS. 20a-f.

A spray head (not shown) follows the contour of the helical groove 99 about the mold 90 and deposits a uniform bed polyurethane 101 against contoured base 102 at the bottom of groove 100. As illustrated in FIG. 20a, bed 101 is trowelled prior to setting with a profiled trowel head 103 and this forms a molded recess 104 into which is laid continuous glass fibre reinforced elastomer 105 as shown in FIG. 20b. Bed 101 will form the helical blade tip and this will be strengthened by the glass fibre elastomer 105 along the length of the helical blade. The reinforcing elastomer 105 is prior to installation placed in a resin matrix under tension.

FIG. 20c shows inserted in groove 100 a polyurethane insert 106 which leaves a space between the insert and wall 107. The resulting space defines the final profile shape of a solid core blade. As shown in FIG. 20d, spacer blocks 111 are applied to the surface 112 of mold 90 over which is placed an external mold 108 as shown in FIG. 20e. The spacer blocks are preferably made of polyurethane which is the same material to be injected onto the cavity formed by the insert mold 106 and external mold shell 108. This arrangement corresponds to the steps illustrated by FIGS. 19f-h. The mold 90 is preferably disposed vertically for injection molding of the inner layer of the drum.

FIG. 19g shows mold shell 108 in an open configuration and FIG. 19h shows mold shell 108 closed for injection molding of polyurethane elastomer 109. Injection of cold setting polyurethane resin into the mold cavity bonds to the extruded elastomer and the matrix of the tensile member and forms the rest of the blade and the elastomeric interior of the concrete mixer. FIG. 19i shows partially completed drum 120 inside grit chamber 121 in which a grit jet is traversed over the shell surface to prepare a surface which is chemically receptive to the bonding of the next stage.

The next step involves filament winding of a fibre reinforced structural layer. A winding arrangement as shown in FIG. 19j is arranged to wind resin wetted fibre rovings 122 around a rotating former. While the resin is still wet, the gel coated external mold 123 is closed over the structural shell to form the external surface of the mixer. This mold includes a track ring for injection of material therein 124 to form a track ring 125.

Drip ring 126 may then be fitted. The mold 123 is removed to expose the drum and the internal mold 90 is then dissolved or broken up for removal. The tensile strength of the windings may be in the order of 600 MPa. FIG. 19j shows drum 120 mounted for rotation on a computer controlled winding machine to enable winding of glass rovings 122. To obtain the optimum physical properties of the filament wound structure the fibres are aligned to the loads imposed in use of the finished drum. Typical loadings on the drum are; axial bending under weight of wet concrete, an applied dynamic load at the drive end of the drum, driving torque and support loads at the discharge trunion rolls. The winding pattern of the filaments aligns the fibres at 10 degrees at mid span to withstand bending stresses increasing in angle and in wall thickness towards the discharge end to accommodate applied roller loads.

The rovings which line the drum are drawn through the resin bath and applied to the surface of the drum as a wide ribbon comprising thousand of tensioned fibres. The composite is applied by winding filament about the drum over the bonding layer to form a fibreglass matrix with high strength properties sufficient to withstand normal operating loads applied during mixing and transporting concrete. The windings overlap until the required thickness is reached. The surface of the drum is covered with wet resin and small irregularities which need to be addressed to provide the external finish. As a result of this construction, the spiral mixing blades inside the drum are solid with high bending and shear resistance during mixing operations. The inner elastomeric surface is highly resistant to abrasion by concrete yet it is softer and lighter than the steel equivalent. The higher resistance to abrasion is facilitated by the natural elastic deformation of the elastomer which absorbs the kinetic energy of the concrete particles without gouging of the surface material. In addition, due to the property of the inner surface which will preferably be polyurethane, the concrete will be mixed rather than slide at the boundary layer ensuring efficient mixing of the concrete throughout the mix and reduction of abrasion due to the smooth curves throughout the interior of the drum. In a further step, the structural layer is finished with a smooth pigmented resin which is applied utilising a clamp similar to that used for completion of the resin layer. FIGS. 19k and l show a two step process for application of a gel coat. Shell 123 is larger than shell 108 to accommodate the additional layer of the windings. As shown in FIGS. 19m and n drum 120 is adapted with a track ring 124 which distributes loads from bunion rollers incorporated on the vehicle on which the drum is to be mounted. The stages illustrated in FIGS. 19k and l allows application of a corporate livery or alternative indicia into the structure of the finished drum as previously described. To achieve this, shell parts 123a and 123b are printed with a selected livery and sprayed with a background gel coat. After gelation a light layer of reinforced composite is applied and allowed to set. The shells are prepared in advance of the operation of application of the fibreglass windings while the resin is still liquid whereupon the shells are clamped around the windings thereby extruding out any excess resin. The shell mold assembly is mounted vertically and a two part compound is injected into a track ring mold space. FIG. 19m shows the orientation of the drum 120 during this step. Once the resin has gelled, the shell molds are removed and the discharge end overwind is trimmed and a polyurethane drip ring 126 is bonded at the discharge end.

The final step involves removal of the mold remaining inside the drum followed by closure of the mandrel hole and cosmetic finishing. The mandrel is removed and the hole fitted with a pipe connection. The drum is stood vertically as illustrated in FIG. 19o and acetone which dissolves the polystyrene is pumped out of the interior which is then cleaned and washed. The drum is then finished by removal of any resin flash. FIG. 20f shows a cross sectional view of a completed blade 110 with mold 90 and mold shell 108 removed. The free end of the blade is enlarged relative to the blade thickness to contain the reinforcing tensile member within the elastomer and to protect the tensile fibres from abrasion as concrete is mixed.

As an alternative to the hollow blades previously described with reference to FIGS. 5 and 6, solid core blades may be used. As the solid core blades which are in the form of a two start helix of variable pitch, application of tension to the high strength reinforcing member will tend to move the member towards the axis of the mixer. This movement is restrained by the radial tension in in the blade material. Concrete loads applied to the blades during mixing and discharge will induce tension in the tensile member in the blade interior so that the concrete loads are carried by tension alone on the components in the mixer. Because the blade material is a low modulus elastomeric material and the blade is restrained by the member along its interior edge and the attachment to the mixer shell along its outer edge the concrete loads will deflect the blade into a sail shaped surface cupped to contain the concrete. This effect is accentuated by curving the interior edge of the blade in the direction of motion of the concrete towards the closed end in the mixing zone and the open end in the concrete discharge zone. Preferably, the tensile member is formed of continuous fibres, such as glass, carbon and aramid reinforcing a reason matrix such as polyurethane, epoxy, polyester or vinylester. The fibres are placed under light tension during manufacturing process so they are uniformly loaded to give maximum strength. Reference in the specification to blades includes reference to a single helical blade along the length of a drum, a two start blade, a multiple start blade arrangement, vanes, paddles and any suitable member for internal mixing of concrete.

The polyurethane elastomer is formed on the exterior of rigid molds. Because the drum is a flask shaped vessel with the outlet smaller than the maximum diameter according to one embodiment this molding method requires separate molds which can be withdrawn towards the maximum diameter. In this case the molding must be joined which increases manufacturing costs. In an alternative embodiment of the method of construction of the drum a disposable rigid mold of a plastic foam is formed in an external mold. The composite mixer is them formed around the exterior of this foam mold which is then broken up or dissolved to remove it from the drum as previously described.

At the drive end of the drum there is provided a steel ring which is molded into the drum structure and proportioned to suit drive equipment. The arrangement is such that it will resist relative rotation between the ring and the fibre reinforced drum under applied torque.

The drum also comprises a track ring, which transmits the vessel loading to the support rollers and is constructed from fibre reinforced plastic formed integral with the structural shell of the vessel. It is anticipated that the plastics drum will outlast its steel equivalent under the same working conditions by more than 10 years. The wall strength will be in the order of 600 Mpa at a thickness of approximately 8 mm comprising approximately 2-8 mm polyurethane and 2-8 mm fibreglass winding. According to one embodiment, the elastomeric layers may be of contrasting colors to enable detection of wear spots.

A further advantage in the use of plastics for the mixing drums lies in the thermal properties of the plastics material. Hot conditions are undesirable for concrete mixing as they accelerate hydration reducing concrete workability which is an essential property required immediately following a concrete pour. In very hot climates, the conventional steel vehicle mounted mixing drums conduct high heat loads which increase heat at the concrete boundary layer due to contact with the super heated drum wall causing unwanted accelerated hydration. This phenomenon is difficult to avoid with steel drums as the conductivity of steel leads to high conductive heat transfer from the outer skin of the drum to the inner wall which is normally in contact with the concrete. In some hot climates, ice is placed in the steel drums in an attempt to arrest temperature increase inside the drum. As concrete hydration is an exothermic reaction, it is sensitive to external temperatures. Accordingly it is desirable that the concrete temperature remains acceptably low to ensure a satisfactory level of workability and to retard hydration. Steel drums heat up significantly and conduct heat through their thickness making the concrete vulnerable to the vagaries of temperature variation. Overheating of the concrete mix is a problem to be avoided and has in accordance with one aspect provided a method of manufacture of a plastics drum to take the place of the conventional steel drums thereby reducing the unwanted effects of high thermal conductivity typical of the steel drums. The plastics drum allows the concrete to remain workable inside the drum for longer periods compared to concrete in steel mixing drums under the same external temperature conditions and transporting concrete. The structural exterior shell is significantly strengthened by the process of filament winding which produces a structure with many times the strength and stiffness of random fibre composites. At the drive end of the drum the steel ring which is molded into the drum structure is proportioned to suit drive equipment. The arrangement is such that it will resist relative rotation between the ring and the fibre reinforced drum under applied torque. The track ring, transmits the vessel loading to the support rollers and is constructed from fibre reinforced plastic formed integral with the structural shell of the vessel.

It will be recognised by persons skilled in the art that numerous variations and modifications may be made to the invention as broadly described herein without departing from the overall spirit and scope of the invention.

What is claimed is:

1. A method for making concrete mixing drum, the method comprising:
   forming a first layer of at least one polymeric material, the first layer including at least a portion of a barrel wall of the drum and a spiral mixing blade, the spiral mixing blade projecting from the wall on an inner surface of the drum; and
   forming a second layer on the formed first layer.

2. The method of claim 1 wherein at least a portion of the spiral mixing blade has a pitch of about 2 meters.

3. The method of claim 2 wherein the spiral mixing blade has a radial mid-portion having a cross-sectional thickness formed from a single homogenous polymeric material.

4. The method of claim 3 including embedding a reinforcement member within the spiral mixing blade.

5. The method of claim 1 wherein the step of forming the second layer includes continuously extending the second layer as a single integral unitary body from a first axial end of the drum across an axial midpoint of the drum.

6. The method of claim 5 including continuously extending the second layer as a single integral unitary body to proximate a second axial end of the drum.

7. The method of claim 1 wherein the step of forming the first layer includes continuously extending the first layer as a single integral unitary body from a first axial end of the drum across an axial midpoint of the drum.

8. The method of claim 7 including continuously extending the first layer as a single integral unitary body to proximate the second axial end of the drum.

9. The method of claim 1 wherein the second layer includes a fiber reinforced plastic.

10. The method of claim 9 wherein the second layer is formed by winding the fiber reinforced plastic about an axial center line of the drum.

11. The method of claim 10 wherein the fiber reinforced plastic is wound in a pattern such that fibers of the fiber reinforced plastic are aligned at a first angle at an axial midpoint of the drum and at a second larger angle towards a discharge end of the drum.

12. The method of claim 11 wherein the first angle is 10 degrees.

13. The method of claim 10 wherein the fiber reinforced plastic wound about the axial center line of the drum has a first thickness at an axial midpoint of the drum and a second larger thickness towards the discharge end of the drum.

14. The method of claim 10 wherein the fiber reinforced plastic being wound about the axial center line of the drum comprises a resin wetted fiberglass roving.

15. The method of claim 10 wherein windings of the fiber reinforced plastic are overlapped with one another.

16. The method of claim 10 wherein the fiber reinforced plastic is continuously wound from a first axial end of the drum across an axial midpoint of the drum.

17. The method of claim 16 wherein the fiber reinforced plastic is continuously wound from the first axial end of the drum to proximate a second axial end of the drum.

18. The method of claim 1 wherein the first layer includes a urethane-based material.

19. The method of claim 1 including the step of forming a spiral mixing blade on the first layer so that the blade continuously extends as a single integral unitary body from a first axial end of the drum across an axial midpoint of the drum.

20. The method of claim 19 including continuously extending the spiral mixing blade as a single integral unitary body to proximate a second axial end of the drum.

21. The method of claim 19 wherein the step of forming a spiral mixing blade on the first layer includes integrally forming at least a portion of the spiral mixing blade as part of a single integral unitary body with the first layer.

22. A method for making a concrete mixing drum, the method comprising:
  forming a first layer of at least one polymeric material, the first layer including at least a portion of an inner surface of the drum and at least a portion of a spiral mixing blade; and
  forming a second layer on the formed first layer, wherein at least one of the first layer and the second layer continuously extends as a single integral unitary body from a first axial end of the drum across an axial midpoint of the drum.

23. The method of claim 22 wherein the first layer continuously extends as a single integral unitary body from the first axial end of the drum across an axial midpoint of the drum.

24. The method of claim 23 wherein the first layer continuously extends as a single integral unitary body to proximate a second axial end of the drum.

25. The method of claim 24 wherein the second layer continuously extends as a single integral unitary body from the first axial end of the drum to proximate the second axial end of the drum.

26. The method of claim 22 wherein the second layer includes a fiber reinforced plastic.

27. The method of claim 22 wherein the second layer includes a fiber reinforced plastic, wherein the method farther includes continuously winding the fiber reinforced plastic from a first axial end of the drum across an axial midpoint of the drum.

28. The method of claim 27 including continuously winding the fiber reinforced plastic to proximate a second axial end of the drum.

29. The method of claim 22 wherein the spiral mixing blade portion of the first layer continuously extends as a single integral unitary body from a first axial end of the drum across an axial midpoint of the drum.

30. The method of claim 29 including continuously extending the spiral mixing blade as a single integral unitary body to proximate a second axial end of the drum.

31. A method of manufacture of a plastics concrete mixing drum comprising the steps of:
  a) preparing a mold having a surface defining an internal profile of said drum which includes a wall having recesses which provide a mold part for continuous helical mixing blades included in said drum;
  b) applying a release agent to an outer surface of said mould;
  c) applying over said release agent a plastics layer in liquid form and allowing said plastics layer to set against the mould so as to form a first layer of a wall of said drum;
  d) applying a bonding layer to said plastics layer;
  e) applying a fibre reinforced composite layer to said bonding layer; and
  f) removing the mold from the interior of said drum.

32. A method according to claim 31 comprising the further step prior to step a) of forming said mold from expanded polystyrene.

33. A method according to claim 31 comprising the further step of placing a fibre reinforced member along a concave tip of said helical mixing blade.

34. A method according to claim 31 comprising the further step prior to application of said fibre reinforced composite layer of moving said drum formed about said mold to a grit blasting chamber wherein a grit jet is traversed over the drum to prepare an outer surface of said drum with a bonding agent to receive said outer layer.

35. A method according to claim 31 wherein the drum is manufactured from three mold parts, two of which form end parts of the drum and a third forming a central part for location between said end parts.

36. A method according to claim 35 wherein each mold part has a formation which imparts to the drum part formed by the mold part, a part spiral extending inwardly from the wall of the drum part such that when the drum parts are engaged together, an internal archimedian spiral is formed wherein the molds are configured such that when the drum parts formed from the molds are mated together, an internal archimedian spiral used for both mixing and discharge of concrete from the drum is formed.

37. A method according to claim 36 wherein the outer mold surfaces are prepared with a release agent so the surface of the plastics layer may be separated after curing.

38. A method according to claim 31 wherein said plastics layer is an elastomer is selected from polyurethane and like materials and has a surface property which reduces surface abrasion on the inner surface of said drum but promotes mixing of said concrete.

39. A method of manufacture of a vehicle mounted concrete mixing drum comprising the steps of:
   a) fabricating base mold sections for receiving plastics material used in the formation of said drum;
   b) assembling said base mold sections;
   c) clamping said mold sections together to form a helical groove about said mold sections;
   d) applying a plastics material to the outside of said mold sections whereby the plastics material forms an interior layer of said drum;
   e) applying an intermediate bonding layer to the outside of said interior layer;
   f) applying to said bonding layer a reinforced outer structural layer wound about said mold sections wherein said interior, intermediate and outer layers form a wall of said mixing drum.

40. A method according to claim 39 wherein said mold parts are clamped together prior to application of said interior layer via aligning dowels and an adhesive.

41. A method according to claim 39 wherein said mold sections are fabricated from polystyrene beads.

42. A method according to claim 39 wherein said interior layer is formed by a polyurethane elastomer sprayed onto said mold sections.

43. A method according to claim 39 comprising the further step of immersing a composite member of glass fibre strands in a resin bath and winding said member into said grooves to reinforce a tip of said helical groove.

44. A method according to claim 43 comprising the further step of bridging said helical groove with a fibre reinforced composite of resin and chopped glass strands and applying said composite to the surface of said bonding layer, hand rolling said strands and clamping about the exterior of said molds prior to setting of said resin and chopped glass strand.

45. A method according to claim 44 comprising the further step of allowing the resin of said composite member to cure for a predetermined period.

46. A method according to claim 44 wherein filaments of said fibre reinforced composite are wound about and along said drum at angles of 10 degrees or greater and to a predetermined thickness.

47. A method according to claim 44 comprising the further steps of:
   i) preparing a printed layer on a second mold shell and covering said layer with a gel coat;
   ii) applying to said gel coat a light layer of fibre reinforced composite;
   whereupon while said resin of said composite is still liquid said shell is clamped about said drum until excess resin is squeezed from said shell.

48. A method according to claim 47 including the further step of injecting a compound into said mold shell to form a stiffening ring at the location of loads applied by drum support rollers.

49. A method according to claim 44 comprising the further step of allowing the resin of said fibre reinforced outer structural layer composite to cure for a predetermined period.

50. A method according to claim 39 wherein there are three mold sections which when joined together include a helical screw.

51. A method according to claim 50 comprising the further step of spraying a wall of said groove with polyurethane to a predetermined thickness along said wall forming a blade profile terminating in a free end, wherein said blade profile includes at its free end a return forming a groove in which is placed a continuous glass fibre reinforced elastomer which reinforces said blade along the length of said blade.

52. A method according to claim 51 comprising the additional step of spraying additional polyurethane over said reinforcing glass fibre elastomer to embed said elastomer in said polyurethane.

53. A method according to claim 39 comprising the further step, prior to application of said fibre reinforced composite layer, of moving said drum formed about said mold to a grit blasting chamber wherein a grit jet is traversed over the drum to prepare an outer surface thereof with a bonding agent to receive said outer layer.

54. A method according to claim 39 wherein the drum is manufactured from three mold parts, two of which are configured to mold end portions of the drum and a third configured to mold a central portion between said end portions.

55. A method according to claim 54 wherein each mold part includes a recessed formation, said recessed formation imparting to the drum an internal archimedian spiral for both mixing and discharge of concrete from the drum.

56. A method according to claim 55 comprising the further step of placing an insert mold over said recesses and spraying polyurethane elastomer over said insert mold and over the outer surface of said mold to form a continuous layer of polyurethane.

57. A method according to claim 56 comprising a further step prior to spraying said polyurethane of application of a release agent so said polyurethane layer may be separated from said mold.

58. A method according to claim 39 wherein said mold parts are mounted on a mandrel and rotated during application of said interior layer of said drum.

59. A method according to claim 39 wherein said interior layer of said drum is prepared in two steps, the first of which comprises the application of said plastics material to the wall of said groove formed in said mold parts and the second of which comprises application of said plastics material to the remainder of said mold surface.

60. A method according to claim 59 wherein said polyurethane is applied in said first step using a spray head which traverses a path which generally aligns with said helical recesses as said mandrel rotates thereby applying a uniform distribution of polyurethane along said wall of said recesses, and wherein said second step is performed using a second spray head which traverses a path normal to said mold surface.

61. A method according to claim 59 comprising the further step of inflating the mold and said interior polyurethane layer to ensure complete contact with and adhesion to said fibre reinforced composite.

62. A method according to claim 59 comprising the further step of grit blasting said fibre reinforced composite prior to application of an outer structural layer.

63. A method according to claim 59 wherein said first and/or second steps applied in the application of said interior layer are repeated at least one more time.

64. A method according to claim 39 comprising the further steps of forming a bed of polyurethane in said recesses which form said helical mixing blades, trowelling said bed to form a groove therein and laying in said bed a continuous glass fibre reinforced elastomer to reinforce said mixing blades along the length of said mixing blades.

65. A method according to claim 64 comprising the additional step of inserting a polyurethane insert mold into said recesses such that a space is formed therein having a blade profile.

66. A method according to claim 65 comprising the additional step of setting an external mold at a predetermined spacing from said drum mold and injecting into said external mold polyurethane which fills said space bounded by said insert mold and said spacing between said drum mold and said external mold.

67. A method according to claim 66 wherein said space bounded by said insert mild when filled forms a solid core blade profile.

68. A method according to claim 39 wherein said plastics layer is a polyurethane elastomer and said intermediate adhesive bonding layer is sprayed onto said polyurethane elastomer surface after said polyurethane elastomer surface has gelled.

69. A method according to claim 39 including the step of colouring said drum layers as wear indicators.

70. A method according to claim 39 wherein said mold sections are polystyrene, and comprising the further step of filling said polystyrene mold sections with a chemical which dissolves said polystyrene enabling release of said mold from said drum.

* * * * *